US008351731B2

(12) United States Patent
Guan

(10) Patent No.: US 8,351,731 B2
(45) Date of Patent: Jan. 8, 2013

(54) IMAGE PROCESSING APPARATUS, IMAGING APPARATUS, IMAGE PROCESSING METHOD, AND COMPUTER PROGRAM PRODUCT

(75) Inventor: Haike Guan, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 730 days.

(21) Appl. No.: 11/888,496

(22) Filed: Jul. 31, 2007

(65) Prior Publication Data
US 2008/0027994 A1    Jan. 31, 2008

(30) Foreign Application Priority Data

Jul. 31, 2006 (JP) ................................. 2006-208063
Feb. 15, 2007 (JP) ................................. 2007-034532

(51) Int. Cl.
G06K 9/40 (2006.01)
H04N 5/208 (2006.01)

(52) U.S. Cl. ........................................ 382/266; 348/252
(58) Field of Classification Search ............... 348/222.1, 348/241, 252; 382/254–275
See application file for complete search history.

(56) References Cited

U.S. PATENT DOCUMENTS

| 7,016,081 | B2 | 3/2006 | Araki | |
| 2001/0016064 | A1* | 8/2001 | Tsuruoka et al. | 382/167 |
| 2003/0174223 | A1 | 9/2003 | Hayashi | |
| 2004/0036775 | A1 | 2/2004 | Watson, Jr. et al. | |
| 2004/0165080 | A1 | 8/2004 | Burks et al. | |
| 2005/0157189 | A1* | 7/2005 | Sambongi | 348/241 |
| 2006/0055985 | A1* | 3/2006 | Ikeda | 358/463 |
| 2006/0066736 | A1* | 3/2006 | Tsuruoka | 348/241 |
| 2007/0086674 | A1 | 4/2007 | Guan | |
| 2008/0158395 | A1* | 7/2008 | Tsuruoka | 348/241 |
| 2008/0204577 | A1* | 8/2008 | Tsuruoka | 348/241 |

FOREIGN PATENT DOCUMENTS

| EP | 0 964 584 A1 | 12/1999 |
| EP | 1 176 801 | 1/2002 |
| EP | 1 411 471 A2 | 4/2004 |
| EP | 1 549 049 | 6/2005 |
| EP | 1549049 A | 6/2005 |
| EP | 1 947 840 | 7/2008 |
| JP | 2004-297731 | 10/2004 |
| JP | 2005-044915 | 2/2005 |
| JP | 2005-303519 | 10/2005 |
| JP | 2006-014054 | 1/2006 |
| WO | WO 00/53093 A1 | 9/2000 |

OTHER PUBLICATIONS

European Search Report dated Jan. 15, 2009; App. No. 07252794.8-1241/1885136, 5 pages.

(Continued)

Primary Examiner — Chieh M Fan
Assistant Examiner — Akshay Trehan
(74) Attorney, Agent, or Firm — Blakely, Sokoloff, Taylor & Zafman LLP

(57) ABSTRACT

An image-information obtaining unit obtains image information. An image-component separating unit separates the image information into luminance information and color information. An edge extracting unit extracts edge information from the luminance information. A luminance-noise removing unit removes noise from the luminance information. A color-noise removing unit removes noise from the color information. An image-information synthesizing unit synthesizes image information based on the edge information, the luminance information form which the noise is removed, and the color information from which the noise is removed.

7 Claims, 21 Drawing Sheets

OTHER PUBLICATIONS

U.S. Appl. No. 11/657,196, filed Jan. 23, 2007, Haike Guan.

Extended European Search Report, 07252794.8-1241/1885136, Nov. 11, 2009, 20 pages.

European Office Action for related European Application No. 07252794.8, Feb. 6, 2012, 6 pgs.

* cited by examiner

FIG. 2

| IMAGING CONDITION | | | EDGE-EXTRACTION-FILTER SIZE |
|---|---|---|---|
| SENSITIVITY OF CAMERA | EXPOSURE TIME | TEMPERATURE AT SHOOTING | |
| XXX ⋮ | XXX ⋮ | XXX ⋮ | XXX ⋮ |

FIG. 3

| IMAGING CONDITION | | | σ VALUE | k VALUE |
|---|---|---|---|---|
| SENSITIVITY OF CAMERA | EXPOSURE TIME | TEMPERATURE AT SHOOTING | | |
| XXX ⋮ | XXX ⋮ | XXX ⋮ | XXX ⋮ | XXX ⋮ |

FIG. 4

| IMAGING CONDITION | | | NOISE-REMOVAL-FILTER SIZE | |
|---|---|---|---|---|
| SENSITIVITY OF CAMERA | EXPOSURE TIME | TEMPERATURE AT SHOOTING | LUMINANCE FILTER | COLOR FILTER |
| XXX ⋮ | XXX ⋮ | XXX ⋮ | FIRST SIZE INFORMATION ⋮ | SECOND SIZE INFORMATION ⋮ |

FIG. 5

| IMAGING CONDITION | | | σ VALUE |
|---|---|---|---|
| SENSITIVITY OF CAMERA | EXPOSURE TIME | TEMPERATURE AT SHOOTING | |
| XXX ⋮ | XXX ⋮ | XXX ⋮ | XXX ⋮ |

FIG. 7

| A1 | A2 | A3 | A2 | A1 |
|----|----|----|----|----|
| A2 | A4 | A5 | A4 | A2 |
| A3 | A5 | A6 | A5 | A3 |
| A2 | A4 | A5 | A4 | A2 |
| A1 | A2 | A3 | A2 | A1 | k

FIG. 13

| IMAGING CONDITION | | | SCALING FACTOR | |
|---|---|---|---|---|
| SENSITIVITY OF CAMERA | EXPOSURE TIME | TEMPERATURE AT SHOOTING | LUMINANCE INFORMATION | COLOR INFORMATION |
| XXX | XXX | XXX | XXX | XXX |
| ⋮ | ⋮ | ⋮ | ⋮ | ⋮ |

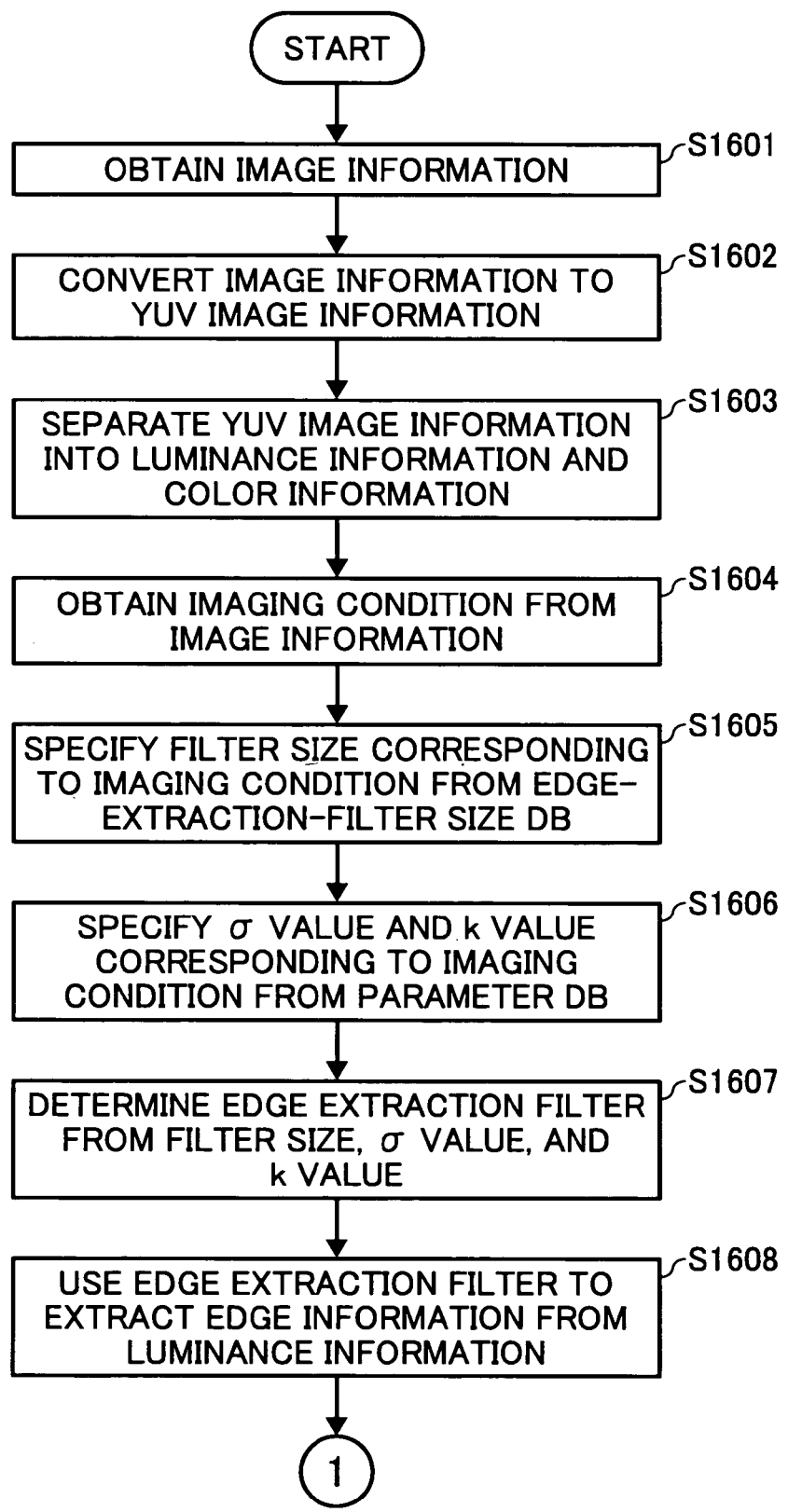

FIG. 20

|  | 1 | 1 | 1 |
|---|---|---|---|
| $\frac{1}{9}$ | 1 | 1 | 1 |
|  | 1 | 1 | 1 |

FIG. 21

| | | | | |
|---|---|---|---|---|
| A1 | A2 | A3 | A2 | A1 |
| A2 | A4 | A5 | A4 | A2 |
| A3 | A5 | A6 | A5 | A3 |
| A2 | A4 | A5 | A4 | A2 |
| A1 | A2 | A3 | A2 | A1 | k

IMAGE PROCESSING APPARATUS, IMAGING APPARATUS, IMAGE PROCESSING METHOD, AND COMPUTER PROGRAM PRODUCT

PRIORITY

The present claims priority to and incorporates by reference the entire contents of Japanese priority documents, 2006-208063, filed in Japan on Jul. 31, 2006, and 2007-034532, filed in Japan on Feb. 15, 2007.

BACKGROUND OF THE INVENTION

1. Field of the Invention

The present invention relates to an image processing apparatus, an imaging apparatus, an image processing method, and a computer program product.

2. Description of the Related Art

In recent years, in the field of digital still cameras (hereinafter, "digital cameras"), an increase in the number of pixels of a charge-coupled device (CCD) or an imaging device has been achieved. On the other hand, such an increase in the number of pixels of the CCD poses a problem of a decrease in sensitivity of the CCD.

To solve such a problem, an imaging apparatus in which pixels of a plurality of images are added is disclosed (see Japanese Patent Application Laid-Open No. 2005-44915). In such an imaging apparatus, pixels of images are added to increase sensitivity.

Also, another imaging apparatus is disclosed (see Japanese Patent Application Laid-Open No. 2005-303519) in which a pixel signal for adding pixel values of adjacent pixels together is output to increase sensitivity.

Furthermore, a technology is also disclosed (see Japanese Patent Application Laid-Open No. 2004-297731) in which, although noise is enhanced when an image is shot with increased sensitivity, a cut-off frequency of a low-pass filter is set according to imaging sensitivity to remove noise.

However, in the technology disclosed in Japanese Patent Application Laid-Open No. 2005-44915, with the addition of the pixels of the images, an exposure time is increased. There is no problem if the camera is fixed and the subject does not move. However, if either one of the camera or the subject moves a positional deviation will disadvantageously occur.

Also, in the technology disclosed in Japanese Patent Application Laid-Open No. 2005-303519, pixel values of adjacent pixels are added together, thereby causing a problem of decreasing resolution.

Moreover, in the technology disclosed in Japanese Patent Application Laid-Open No. 2004-297731, although noise can be removed according to imaging sensitivity, the edge of the image is blurred. For example, if sensitivity is set high when imaging is performed at a lighted place, a blurring process may have a strong effect on an image even with less noise, thereby causing the image to be blurred more than necessary.

Still further, in the technology disclosed in Japanese Patent Application Laid-Open No. 2004-297731, when the exposure time is short at the time of imaging, color reproducibility and white balance are deteriorated, and the balance between color and luminance of the image is not improved even noise is removed.

SUMMARY OF THE INVENTION

An image processing apparatus, imaging apparatus, image processing method, and computer program product are described. In one embodiment, an image processing apparatus comprising: an image-information obtaining unit that obtains image information; an image-component separating unit that separates the image information obtained by the image-information obtaining unit into luminance information and color information; an edge extracting unit that extracts edge information from the luminance information separated by the image-component separating unit; a luminance-noise removing unit that removes noise from the luminance information separated by the image-component separating unit; a color-noise removing unit that removes noise from the color information separated by the image-component separating unit; and an image-information synthesizing unit that synthesizes image information based on the edge information extracted by the edge extracting unit, the luminance information from which the noise is removed by the luminance-noise removing unit, and the color information from which the noise is removed by the color-noise removing unit.

BRIEF DESCRIPTION OF THE DRAWINGS

FIG. 2 is a table for illustrating an example of a data structure of an edge-extraction-filter size database;

FIG. 3 is a table for illustrating an example of a data structure of a parameter database;

FIG. 4 is a table for illustrating an example of a data structure of a noise-removal-filter size database;

FIG. 5 is a table for illustrating an example of a data structure of a Gaussian σ-value database;

FIG. 7 is a drawing for illustrating an example of an edge extraction filter with a filter size of 5×5;

FIG. 13 is a table for illustrating an example of a data structure of a scaling-factor database according to the second embodiment;

FIG. 16A is a flowchart of an image processing procedure performed by an image-information obtaining unit, an image-information converting unit, a component separating unit, an imaging-condition obtaining unit, a filter determining unit, a luminance-component edge extracting unit, a luminance-component noise removing unit, a color-component noise removing unit, an image-information synthesizing unit, an image-information converting unit, and an image-information output unit;

FIG. 20 is a drawing for illustrating an example of a smoothing filter with a filter size of 3×3;

FIG. 21 is a drawing for illustrating an example of an edge extraction filter with a filter size of 5×5;

DETAILED DESCRIPTION OF THE PREFERRED EMBODIMENTS

Figure 1:
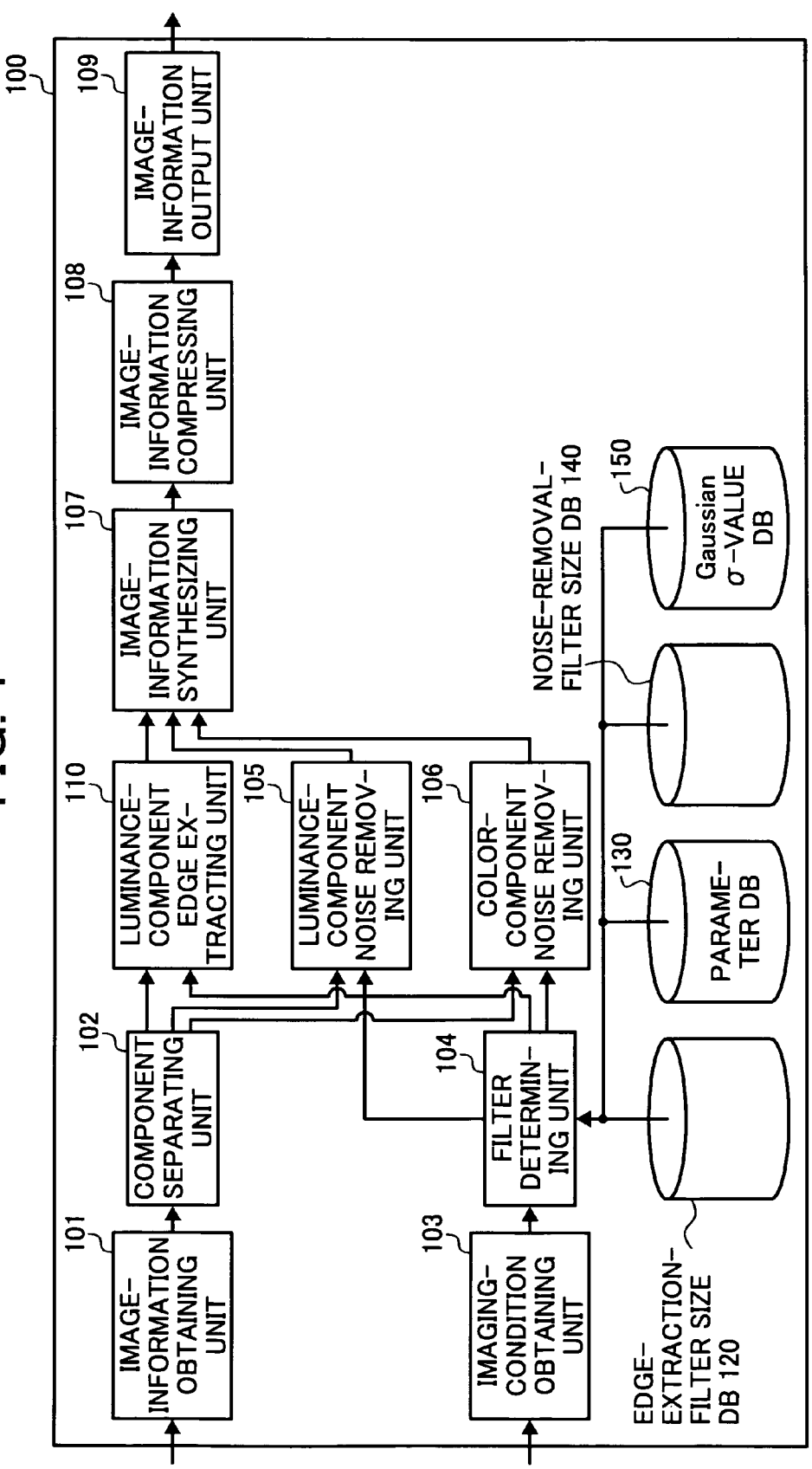
FIG. 1 is a block diagram of a configuration of an image processing unit according to a first embodiment of the present invention.

An image processing apparatus according to one embodiment of the present invention includes an image-information obtaining unit that obtains image information; an image-component separating unit that separates the image information obtained by the image-information obtaining unit into luminance information and color information; an edge extracting unit that extracts edge information from the luminance information separated by the image-component separating unit; a luminance-noise removing unit that removes noise from the luminance information separated by the image-component separating unit; a color-noise removing unit that removes noise from the color information separated by the image-component separating unit; and an image-information synthesizing unit that synthesizes image information based on the edge information extracted by the edge extracting unit, the luminance information from which the noise is removed by the luminance-noise removing unit, and the color information from which the noise is removed by the color-noise removing unit.

An image processing method according to another embodiment of the present invention includes obtaining image information; separating the image information obtained at the obtaining into luminance information and color information; extracting edge information from the luminance information resulting from separating the image information; luminance-noise removing including removing noise from the luminance information resulting from separating the image information; color-noise removing including removing noise from the color information resulting from separating the image information; and synthesizing image information based on the edge information extracted at the extracting operation, the luminance information from which the noise is removed as a result of the luminance-noise removing operation, and the color information from which the noise is removed at the color-noise removing.

An image processing method according to still another embodiment of the present invention includes obtaining image information; separating the image information obtained at the obtaining into luminance information and color information; extracting edge information from the luminance information resulting from separating the image information; performing a scaling on the luminance information and the color information resulting from the separating the image information; luminance-noise removing including removing noise from the luminance information on which the scaling is performed; color-noise removing including removing noise from the color information on which the scaling is performed; and synthesizing image information based on the edge information extracted as a result of performing the extracting operation, the luminance information from which the noise is removed as a result of performing the luminance-noise removing operation, and the color information from which the noise is removed as a result of performing the color-noise removing operation.

The above and other embodiments, features, advantages and technical and industrial significance of this invention will be better understood by reading the following detailed description of presently preferred embodiments of the invention, when considered in connection with the accompanying drawings.

Exemplary embodiments of the present invention are explained in detail below with reference to the accompanying drawings.

With reference to the attached drawings, a first embodiment of the present invention is explained. First, a configuration example of an image processing unit included in a digital camera to which the present invention is applied is explained. FIG. 1 is a block diagram of the configuration of an image processing unit 100 according to the first embodiment.

The image processing unit 100 includes an image-information obtaining unit 101, a component separating unit 102, an imaging-condition obtaining unit 103, a filter determining unit 104, a luminance-component edge extracting unit 110, a luminance-component noise removing unit 105, a color-component noise removing unit 106, an image-information synthesizing unit 107, an image-information compressing unit 108, an image-information output unit 109, an edge-extraction-filter size database 120, a parameter database 130, a noise-removal-filter size database 140, and a Gaussian σ-value database 150.

The edge extraction filter size is a size of a filter for use in extracting an edge from image information. An optimum size of the filter for use in edge extraction varies depending on the imaging condition. The edge-extraction-filter size database 120 stores an optimum filter size for each imaging condition. FIG. 2 is a table for illustrating an example of a data structure of an edge-extraction-filter size database. In this manner, in the edge-extraction-filter size database 120, imaging conditions and edge extraction filter sizes are associated with each other. Therefore, an optimum filter size can be determined from the imaging condition.

The imaging condition is a condition that influences edge extraction in an image shot by the digital camera. Specifically, sensitivity of the camera, exposure time, and temperature at shooting are defined as imaging conditions. The sensitivity of the camera indicates the sensitivity of a CCD or complementary metal oxide semiconductor (CMOS) sensor. As the sensitivity is higher, the shutter speed is higher, camera shake tends not to occur, and a moving subject can be shot without blurring. Furthermore, a bright image can be shot even at a dark place. On the other hand, if the sensitivity is increased, noise tends to occur.

The exposure time indicates a time during which light is applied to the CCD or CMOS sensor. If the sensitivity is high, an image can be shot even with a decreased exposure time. The temperature at shooting indicates an outside air temperature at the time of shooting by camera. As the temperature is lower, noise tends not to occur.

According to the first embodiment, the sensitivity of camera, exposure time, and temperature at shooting are taken as imaging conditions. However, the imaging conditions are not meant to be restricted to those above, and are arbitrary as long as they change edge extraction.

The parameter database 130 stores σ values and κ values for calculating a value of a Laplacian of Gaussian (LoG) filter for edge extraction corresponding to the imaging condition. FIG. 3 is a table for illustrating an example of a data structure of the parameter database. The parameter database 130 stores the imaging conditions, σ values and κ values for calculating a value of the LoG filter in association with each other.

The σ value indicates a parameter that determines a width of the filter. As the σ value is larger, the width of the filter is wider, and the smoothing effect is larger. As the σ value is smaller, the width of the filter is narrower, and the effect of edge enhancement is stronger.

The κ value indicates a parameter representing a strength of edge enhancement. As the κ value is larger, the effect of edge enhancement is larger. As the κ value is smaller, the effect of blur recovery is smaller. In this manner, with the σ value and κ value being changed, the correction result can be adjusted. Here, when the σ value of the LoG filter is closer to zero, the filter is more analogous to a Laplacian filter.

The edge extraction filter is found not only from the LoG function. Alternatively, a filter found from another function may be used for performing an edge extraction process.

The noise-removal-filter size database 140 stores a filter size for noise removal corresponding to the imaging condition. FIG. 4 is a table illustrating an example of a data structure of a noise-removal-filter size database. The noise-removal-filter size database 140 stores the imaging conditions and filter sizes in association with each other.

The filter size indicates a size of a noise removal filter specified by the imaging condition, and a filter size is stored for each of luminance information and color information. As the filter size is larger, the effect of noise removal is larger, but edge blurring is larger. That is, the noise removal effect and edge blurring have a trade-off relation. Since the noise level of the shot image varies depending on the imaging condition, the filter size is selected according to the imaging condition at the time of shooting, thereby performing optimum noise level.

Human eyes have a property of being sensitive to changes in luminance, but being dull to changes in color. Therefore, the filter size for the luminance information is set smaller than the filter size for the color information, thereby performing effective noise removal in consideration of the property of human eyes. Image information in YUV format is formed of luminance information (Y) and color information (U, V). The luminance information indicates a value approximately proportional to the strength sensed by human eyes as "luminance". In the color information (U, V), U represents hue and chroma of blue series, and V represents those of red series. For each of the luminance information and the color information, a corresponding noise removal process is performed, thereby optimally removing noise. In the present embodiment, in the noise-removal-filter size database 140, first size information indicating a size of a luminance filter and second size information indicating a size of a color filter store the same size. Here, the size of the luminance filter indicated by the first size information may be smaller than the size of the color filter indicated by the second size information.

The Gaussian σ-value database 150 stores σ values for calculating σ value of a Gaussian smoothing filter for noise removal corresponding to the imaging condition. FIG. 5 is a table illustrating an example of a data structure of a Gaussian σ-value database. The Gaussian σ-value database 150 stores the imaging conditions and σ values for calculating values of a Gaussian smoothing filter in association with each other.

The magnitude of the σ value represents the strength of noise removal. As the σ value is larger, the noise removal effect is larger. Here, the filter is found not only from the Gaussian function. Alternatively, a filter found from another function may be used for performing a noise removal process.

The image-information obtaining unit 101 obtains image information from temporary-storage memory. The obtained image information is image information converted to YUV format. The component separating unit 102 separates the image information in YUV format obtained by the image-information obtaining unit 101 into luminance information (Y) and color information (U, V).

The imaging-condition obtaining unit 103 obtains an imaging condition corresponding to the image information obtained by the image-information obtaining unit 101 from the temporary-storage memory. This imaging condition is an imaging condition at the time of shooting, that is, the sensitivity of camera, exposure time, and temperature at shooting, and they are stored in association with each other. Here, the imaging condition at the time of shooting may be stored as part of the image information.

The filter determining unit 104 determines an edge extraction filter and noise removal filters (a luminance filter and a color filter) corresponding to the imaging condition. First, the filter determining unit 104 specifies, from the edge-extraction-filter size database 120, the size of an edge extraction filter associated with the imaging condition obtained by the imaging-condition obtaining unit 103, and specifies, from the parameter database 130, a σ value and κ value of the LoG function associated with the imaging condition obtained by the imaging-condition obtaining unit 103.

The filter determining unit 104 further uses the edge extraction filter size and the σ value of the LoG function to calculate an edge extraction filter by using the following equation (1).

$$LoG(x, y) = -\frac{1}{\pi\sigma^4}\left[1 - \frac{x^2+y^2}{2\sigma^2}\right]e^{-\frac{x^2+y^2}{2\sigma^2}} \quad (1)$$

Also, the filter determining unit 104 determines noise removal filters corresponding to the imaging condition. The filter determining unit 104 specifies, from the noise-removal-filter size database 140, the size of noise removal filters associated with the imaging condition obtained by the imaging-condition obtaining unit 103, that is, the size of a luminance filter for removing noise from the luminance information and the size of a color filter for removing noise from the color information. Also, the filter determining unit 104 specifies, from the Gaussian σ-value database 150, the σ value of the Gaussian function associated with the imaging condition obtained by the imaging-condition obtaining unit 103.

The filter determining unit 104 further uses the size of the luminance filter and the σ value of the Gaussian function to calculate a luminance filter (Gaussian smoothing filter) by using the following equation (2).

$$G(x, y) = \frac{1}{2\pi\sigma^2}e^{-\frac{x^2+y^2}{2\sigma^2}} \quad (2)$$

Also, the filter determining unit 104 uses the size of the color filter and the σ value of the Gaussian function to calculate a color filter (Gaussian smoothing filter) by using the equation (2) mentioned above.

The luminance-component edge extracting unit 110 uses the edge extraction filter determined by the filter determining unit 104 and the κ value to extract edge information from the luminance information. The edge information extraction result is represented by the following equation (3)

$$g(x,y) = -k\text{LoG}(x,y) \otimes f(x,y) \quad (3)$$

where symbols of operation in the equation (3) represent a convolution process.

The luminance-component noise removing unit 105 uses the noise removal filter determined by the filter determining unit 104, that is, the luminance filter (low-pass filter), to remove noise from the luminance information. The color-component noise removing unit 106 uses the noise removal filter determined by the filter determining unit 104, that is, the color filter (low-pass filter), to remove noise from the color information.

The image-information synthesizing unit 107 combines the edge information extracted from the luminance-component edge extracting unit 110, the luminance information with noise removed therefrom by the luminance-component noise removing unit 105, and the color information with noise removed therefrom by the color-component noise removing unit 106 to generate image information in YUV format. The image-information synthesizing unit 107 forms an image-information generating unit according to one embodiment of the present invention. Combining of the edge information and the luminance information is calculated by the following equation (4)

$$s(x,y) = f_s(x,y) - k\text{LoG}(x,y) \otimes f(x,y) \quad (4)$$

where fs(x,y) represents a luminance-component subjected to a noise-removal filter process, and s(x,y) represents a synthetic image. The luminance information calculated with the equation (4) is further combined with the color information to generate image information. Here, the image information in YUV format may be further converted to image information in another format, for example, in RGB format.

The image-information compressing unit 108 compresses the image information in YUV format synthesized by the image-information synthesizing unit 107 to, for example, Joint Photographic Experts Group (JPEG) format. The image-information output unit 109 outputs the image information compressed by the image-information compressing unit 108 to a memory card or the like.

Figure 6A:
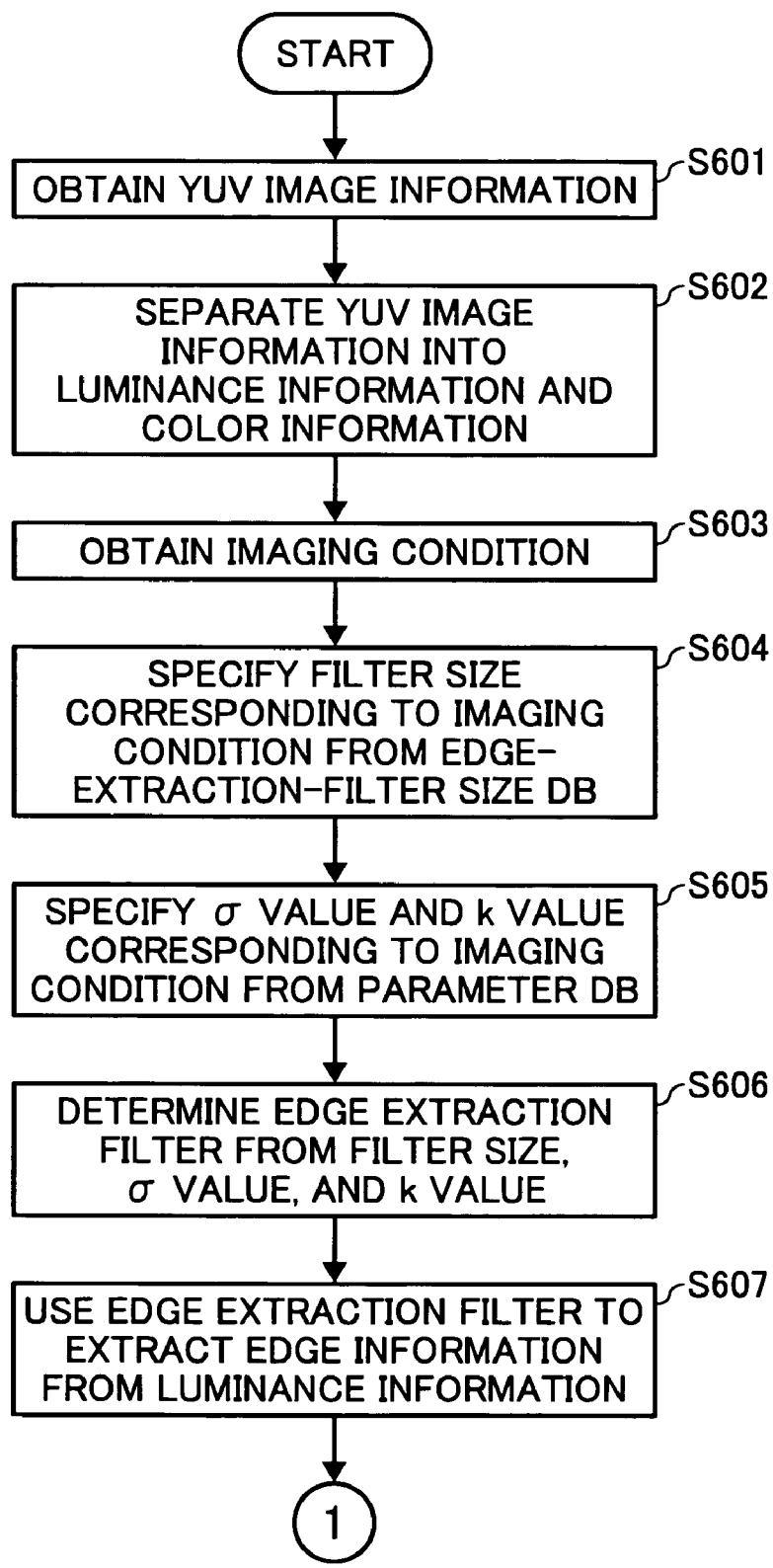
FIG. 6A is a flowchart of an image processing procedure performed by an image-information obtaining unit, a component separating unit, an imaging-condition obtaining unit, a filter determining unit, a luminance-component edge extracting unit, a luminance-component noise removing unit, a color-component noise removing unit, an image-information synthesizing unit, an image-information compressing unit, and an image-information output unit.
Figure 6B:
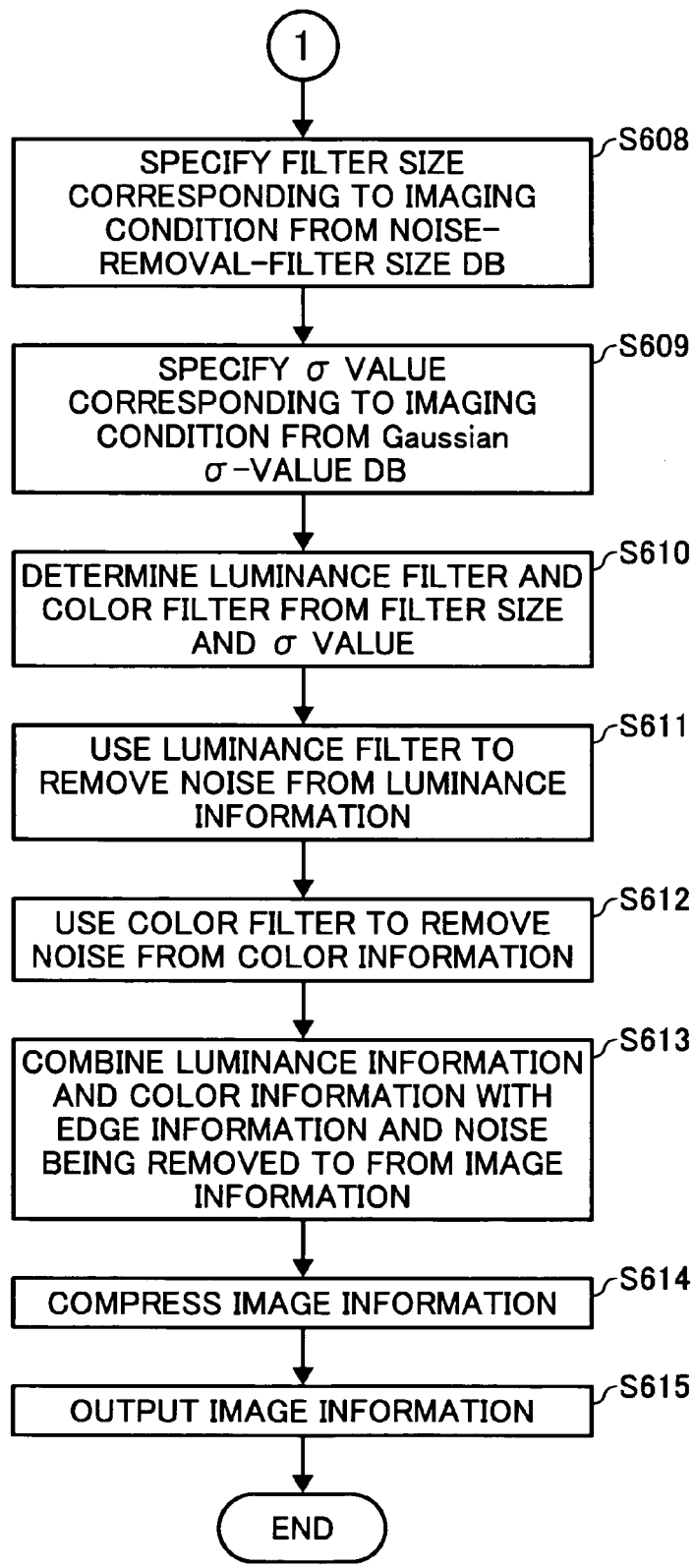
FIG. 6B is a flowchart of the image processing procedure performed by the image-ion information obtaining unit, the component separating unit, the imaging-condition obtaining unit, the filter determining unit, the luminance-component edge extracting unit, the luminance-component noise removing unit, the color-component noise removing unit, the image-information synthesizing unit, the image-information compressing unit, and the image-information output unit.

Next, an image process by the image processing unit 100 configured as mentioned above is explained. FIGS. 6A and 6B depict a flowchart of the image processing procedure performed by the image-information obtaining unit, the component separating unit, the imaging-condition obtaining unit, the filter determining unit, the luminance-component edge extracting unit, the luminance-component noise removing unit, the color-component noise removing unit, the image-information synthesizing unit, the image-information compressing unit, and the image-information output unit.

The image-information obtaining unit 101 obtains image information in YUV format from temporary-storage memory (step S601). The component separating unit 102 separates the image information in YUV format obtained by the image-information obtaining unit 101 into luminance information and color information (step S602). The imaging-condition obtaining unit 103 obtains the imaging condition associated with the image information (step S603).

The filter determining unit 104 specifies, from the edge-extraction-filter size database 120, the size of an edge extraction filter corresponding to the imaging condition obtained by the imaging-condition obtaining unit 103 (step S604). For example, 5×5 is specified as the size of the edge extraction filter.

The filter determining unit 104 specifies, from the parameter database 130, a σ value and κ value of the LoG function corresponding to the imaging condition obtained by the imaging-condition obtaining unit 103 (step S605). The filter determining unit 104 determines each value of the edge extraction filter from the filter size of the edge extraction filter and the σ value and κ value of the LoG function (step S606). For example, FIG. 7 depicts an example of the edge extraction filter with a filter size of 5×5. Ai, which is σ value of the edge extraction filter, is a value calculated by the equation (1).

Figure 8:
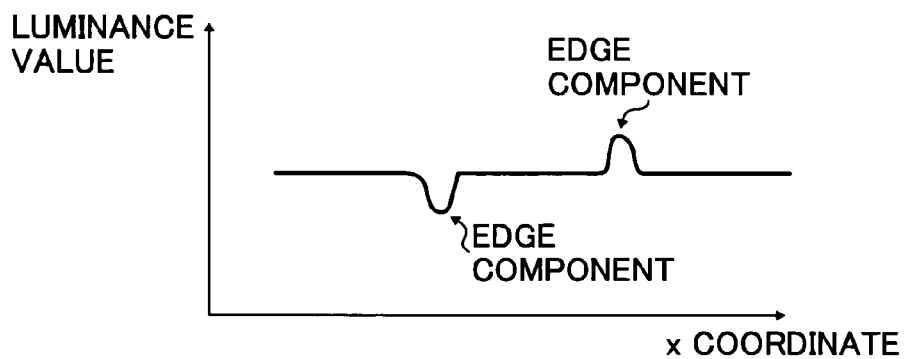
FIG. 8 is a graph for illustrating an example of results of edge extraction using an edge extraction filter.

The luminance-component edge extracting unit 110 uses the edge extraction filter determined by the filter determining unit 104 to extract edge information from the luminance information (step S607). FIG. 8 is a graph for illustrating an example of results of edge extraction using the edge extraction filter. As depicted in FIG. 8, edge components (edge information) are extracted from the image information.

The filter determining unit 104 specifies, from the noise-removal-filter size database 140, the size of the filter corresponding to the imaging condition obtained by the imaging-condition obtaining unit 103 (step S608). Specifically, the size of the luminance filter and the size of the color filter corresponding to the sensitivity of camera, exposure time, and temperature at shooting, which are imaging conditions, are specified.

The filter determining unit 104 specifies, from the Gaussian σ-value database 150, a s value of the Gaussian function corresponding to the imaging condition obtained by the imaging-condition obtaining unit 103 (step S609).

The filter determining unit 104 determines a luminance filter from the filter size of the luminance filter and the specified σ value of the Gaussian function, and determines a color filter from the filter size of the color filter and the specified σ value of the Gaussian function (step S610).

Figure 9:
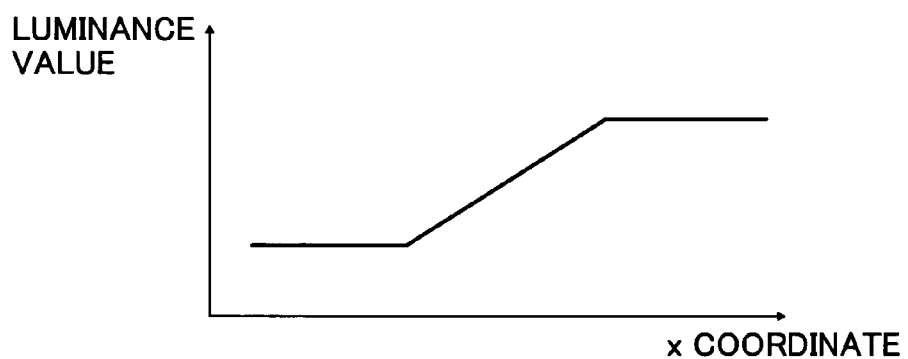
FIG. 9 is a graph for illustrating results of noise removal using a luminance filter.

The luminance-component noise removing unit 105 uses the luminance filter determined by the filter determining unit 104 to remove noise from the luminance information (step S611). FIG. 9 is a graph for illustrating results of noise removal using the luminance filter. The color-component noise removing unit 106 uses the color filter determined by the filter determining unit 104 to remove noise from the color information (step S612).

Figure 10:
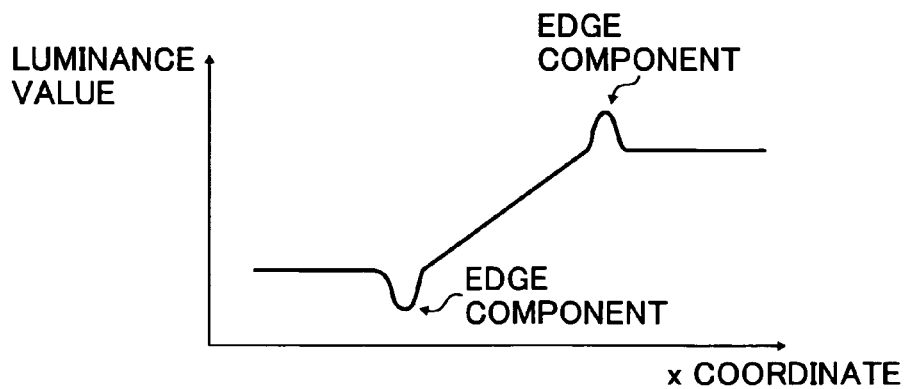
FIG. 10 is a graph for illustrating results obtained by combining edge information and luminance information with noise removed therefrom.

The image-information synthesizing unit 107 combines the edge information, and the luminance information and the color information with noise removed therefrom to generate image information in YUV format (step S613). FIG. 10 is a graph for illustrating results obtained by combining edge information and luminance information with noise removed therefrom. In the synthesized image information, since edges are clearly represented as depicted in FIG. 10, an image without edge blurring and with noise removed therefrom is obtained. The image-information compressing unit 108 compresses the image information in YUV format generated by the image-information synthesizing unit 107 to JPEG format (step S614). The image-information output unit 109 outputs the image information compressed by the image-information compressing unit 108 to a memory card or the like (step S615).

In this manner, the image information is separated into luminance information and color information; edge information is extracted from the luminance information; a noise removal process is performed on the luminance information and the color information, and image information is further synthesized from the edge information and the luminance information and color information with noise removed therefrom. With this, edge components can be extracted in advance before noise removal, and then the edge components can be combined after noise removal. Thus, the edge can be smoothed at the time of noise removal to complement an image with image blurring. That is, noise can be effectively removed with edge blurring being suppressed to keep high image quality.

According to the first embodiment, a filter size, σ value, and κ value are specified based on the imaging condition and then the value of the filter is calculated in order to determine an edge extraction filter. In another example, the edge extraction filter may be determined directly from the imaging condition. In this case, a database storing imaging conditions and edge extraction filters in association with each other is provided, and an edge extraction filter corresponding to the imaging conditions is specified. Then, by using the specified edge extraction filter, edge information is extracted from the luminance information.

Figure 11:
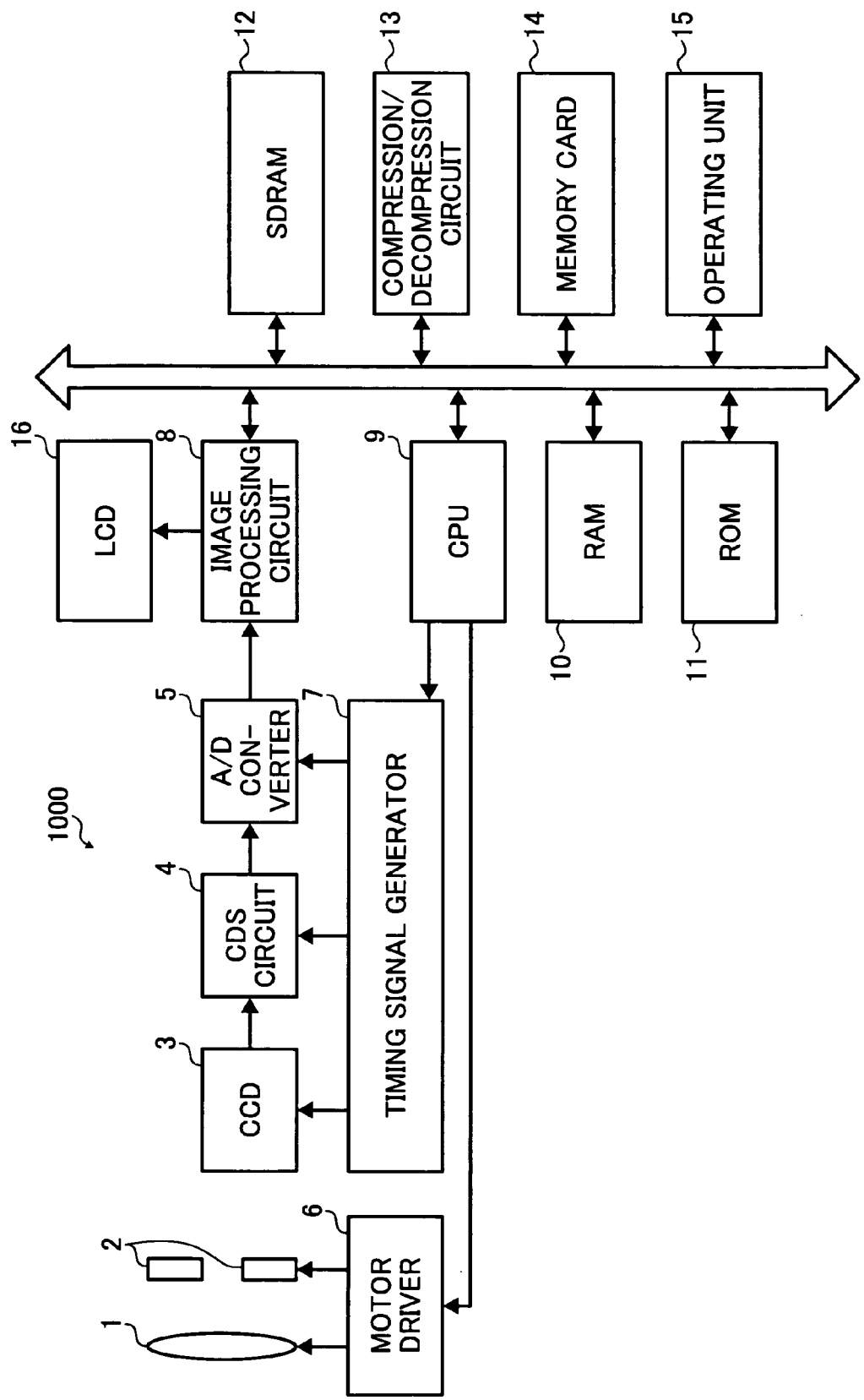
FIG. 11 is a block diagram of a hardware configuration of a digital camera according to the first embodiment.

Next, a hardware configuration of a digital camera, which is one example of an imaging device that performs the image process, is explained. FIG. 11 is a block diagram of a hardware configuration of a digital camera according to the first embodiment. As depicted in FIG. 11, light of a subject first enters a Charge Coupled Device (CCD) 3 via an imaging optical system 1 of a digital camera 1000. Also, a mechanical shutter 2 is disposed between the imaging optical system 1 and the CCD 3. With the mechanical shutter 2, incident light to the CCD 3 can be intercepted. Here, the imaging optical system 1 and the mechanical shutter 2 are driven by a motor driver 6.

The CCD 3 converts an optical image formed on an imaging surface to an electric signal for output as analog image data. The image information output from the CCD 3 has noise components removed by a Correlated Double Sampling (CDS) circuit 4, is converted by an analog-to-digital (A/D) converter 5 to a digital value, and is then output to an image processing circuit 8.

The image processing circuit 8 uses a Synchronous Dynamic Random Access Memory (SDRAM) 12 that temporarily stores image data to perform various image processes, including YUV conversion, white balance control, contrast correction, edge enhancement, and color conversion. Here, white balance control is an image process of adjusting color density of the image information, whilst contrast correction is an image process of adjusting contrast of the image information. Edge enhancement is an image process of adjusting sharpness of the image information, whilst color conversion is an image process of adjusting shades of color of the image information. Also, the image processing circuit 8 causes the image information subjected to signal processing and image processing to be displayed on a liquid-crystal display (LCD) 16.

Also, the image information subjected to signal processing and image processing is recorded on a memory card 14 via a compression/decompression circuit 13. The compression/decompression circuit 13 compresses the image information output from the image processing circuit 8 upon an instruction obtained from an operating unit 15 and then outputs the result to the memory card 14. Also, the compression/decompression circuit 13 decompresses the image information read from the memory card 14 for output to the image processing circuit 8.

Also, the CCD 3, the CDS circuit 4, and the A/D converter 5 are timing-controlled by a Central Processing Unit (CPU) 9 via a timing signal generator 7 that generates a timing signal. Furthermore, the image processing circuit 8, the compression/decompression circuit 13, and the memory card 14 are also controlled by the CPU 9.

In the digital camera 1000, the CPU 9 performs various arithmetic operations according to a program(s), and has incorporated therein, for example, a Read Only Memory (ROM) 11, which is a read only memory having stored therein the program(s) and others, and a Random Access Memory (RAM) 10, which is a freely readable and writable memory having a work area and various data storage areas for use in the course of various processes. These components are interconnected via a bus line.

When the digital camera 1000 performs a noise removal process, a system controller loads a highly-sensitive noise removal program from the ROM 11 to the RAM 10 for execution. The noise removal program obtains, via the system controller, settings of imaging sensitivity and a parameter representing exposure time at shooting. An optimal noise removal setting condition corresponding to these parameters is read from the ROM 11 for noise removal. The image to be processed is temporarily stored in the SDRAM 12, and the stored image is subjected to a noise removal process.

Next, a noise removal method at the time of shooting is explained. First, the characteristic of high-sensitivity noise is explained. In the digital camera (imaging device) 1000, an amplifier of an electric circuit is changed to adjust imaging sensitivity without changing the sensitivity of the CCD 3. When the amount of exposure is small, exposure shortage occurs. In that case, by increasing the magnification of the amplifier, the sensitivity can be increased. However, noise signals are also magnified at the same time. If the amount of exposure is sufficient, a noise signal is relatively small and not so conspicuous. In the case of exposure shortage, when the sensitivity is increased by increasing the magnification of the amplifier, noise is also magnified, and highly-sensitive noise becomes conspicuous. This noise is random noise, and color noise occurs even when a black-and-white subject is shot. To remove the noise of the image information occurring in this manner, the noise removal process explained above is performed.

The edge-extraction-filter size database 120, the parameter database 130, the noise-removal-filter size database 140, and the Gaussian σ-value database 150 can be configured by any storage medium generally used, such as the ROM 11 of the digital camera 1000, a Hard Disk Drive (HDD), an optical disk, and a memory card.

Also, the image processing program to be executed on the digital camera according to the present embodiment may be stored on a computer connected to a network, such as the Internet, and may be downloaded via the network for provision. Also, the image processing program to be executed on the digital camera according to the present embodiment may be provided or distributed via the network, such as the Internet.

Furthermore, the image processing program according to the present embodiment may be incorporated in advance in the ROM or the like for provision.

The image processing program to be executed on the digital camera according to the present embodiment is recorded in an installable or an executable format on a computer-readable storage medium, such as a Compact-Disk Read-Only Memory (CD-ROM), Flexible Disk (FD), Compact-Disk Recordable (CD-R), or Digital Versatile Disk (DVD), for provision.

The image processing program to be executed on the digital camera according to the present embodiment has a module structure including each of the components (the image-information obtaining unit, the component separating unit, the imaging-condition obtaining unit, the filter determining unit, the luminance-component edge extracting unit, the luminance-component noise removing unit, the color-component noise removing unit, the image-information synthesizing unit, the image-information compressing unit, the image-information output unit, and others). As actual hardware, with the CPU (processor) reading the image processing program from the storage medium for execution, each of the units, that is, the image-information obtaining unit, the component separating unit, the imaging-condition obtaining unit, the filter determining unit, the luminance-component edge extracting unit, the luminance-component noise removing unit, the color-component noise removing unit, the image-information synthesizing unit, the image-information compressing unit, the image-information output unit, and others, is loaded and generated onto a main storage device.

A second embodiment of the present invention is explained below. A digital camera as an example of an image processing device according to the second embodiment performs scaling on the luminance information and the color information with noise removed therefrom, and the scaled luminance information and color information, and the edge information are combined to generate image information. Here, only different portions from those according to the first embodiment are explained.

Figure 12:
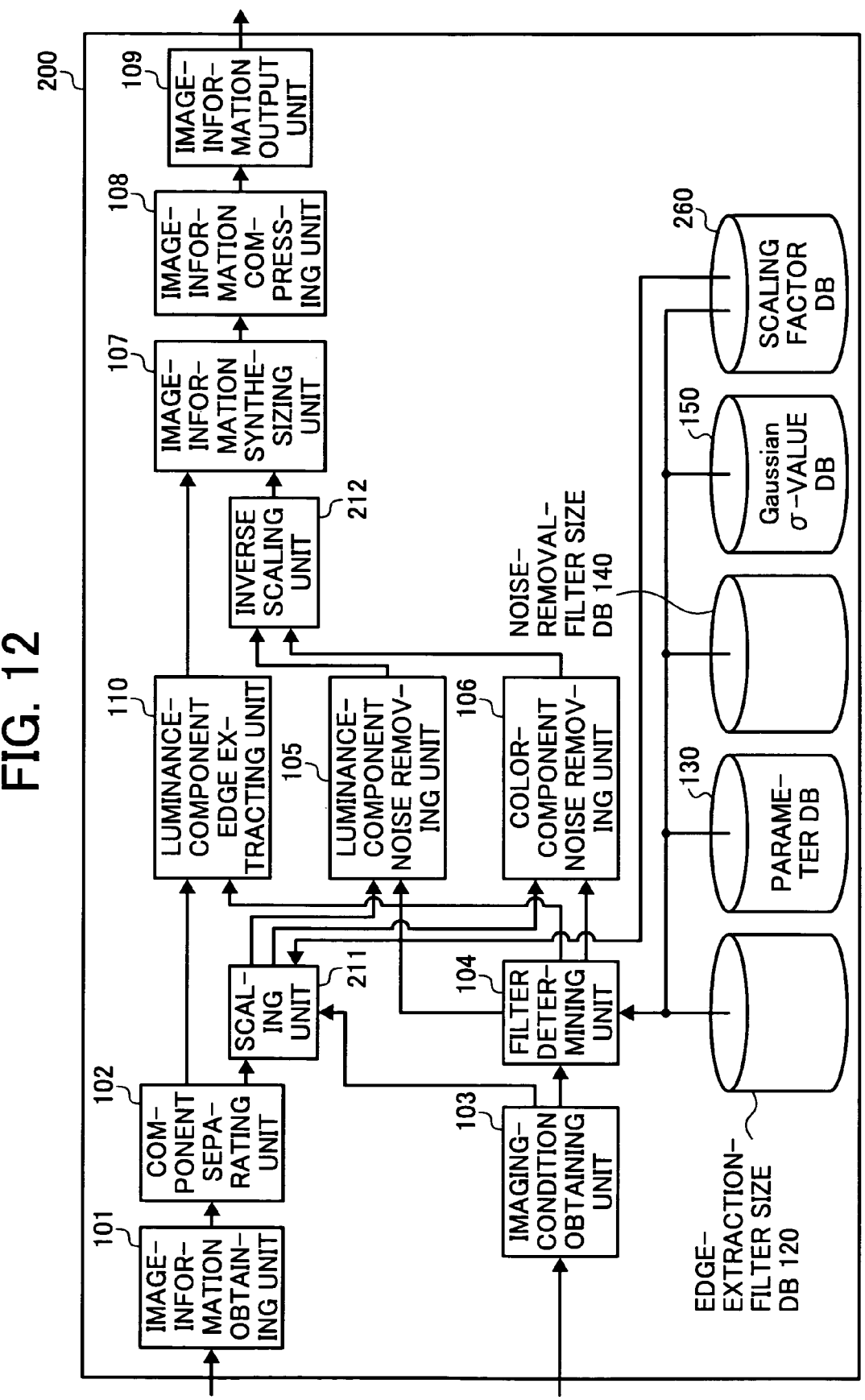
FIG. 12 is a block diagram of the configuration of an image processing unit according to a second embodiment of the present invention.

A configuration example of an image processing unit included in the digital camera to which the present invention is applied is explained. FIG. 12 is a block diagram of the configuration of an image processing unit 200 according to the second embodiment. The image processing unit 200 includes the image-information obtaining unit 101, the component separating unit 102, the imaging-condition obtaining unit 103, the filter determining unit 104, a scaling unit 211, the luminance-component edge extracting unit 110, the luminance-component noise removing unit 105, the color-component noise removing unit 106, an inverse scaling unit 212, the image-information synthesizing unit 107, the image-information compressing unit 108, the image-information output unit 109, the edge-extraction-filter size database 120, the parameter database 130, the noise-removal-filter size database 140, the Gaussian σ-value database 150, and a scaling factor database 260.

The configuration and function of the image-information obtaining unit 101, the component separating unit 102, the imaging-condition obtaining unit 103, the filter determining unit 104, the luminance-component edge extracting unit 110, the luminance-component noise removing unit 105, the color-component noise removing unit 106, the image-information synthesizing unit 107, the image-information compressing unit 108, the image-information output unit 109, the edge-extraction-filter size database 120, the parameter database 130, the noise-removal-filter size database 140, and the Gaussian σ-value database 150 are similar to those in the first embodiment, and are not explained herein.

The scaling factor database 260 stores a scaling factor for each of the luminance information and the color information for scaling corresponding to the imaging condition. FIG. 13 is a table illustrating an example of a data structure of the scaling-factor database. The scaling factor database 260 stores imaging conditions and scaling factors for the luminance information and the color information in association with each other.

The scaling factor is a ratio of changing the size of the luminance information or the color information. To reduce the size, the scaling factor is set smaller than 100%. When scaling is performed at a scaling factor smaller than 100%, the image after scaling is smaller than the original image. When filtering is performed on the image subjected to reduced scaling, since the image subjected to reduced scaling is smaller than the original image, the process time can be reduced, thereby speeding-up the process. Also, by reducing the original image, an effect of a low-pass filter can be obtained.

For example, when the scaling factor is three time in width and three time in length and the size of the noise removal filter is 5×5, the effect of a noise removal filter of 15×15 size can be obtained. When a 15×15 noise removal filter process is performed on the image information, a large amount of time is required. However, when similar process is achieved through a 3×3 scaling process and a noise removal process using a 5×5 noise removal filter, the process time can be reduced.

The scaling unit 211 uses a scaling factor corresponding to the imaging condition obtained from the scaling factor database 260 to perform scaling on the luminance information and the color information obtained through separation by the component separating unit 102.

The inverse scaling unit 212 uses an inverse scaling factor of the scaling unit 211 to perform scaling on the luminance information with noise removed therefrom by the luminance-component noise removing unit 105 and the color information with noise removed therefrom by the color-component noise removing unit 106.

Figure 14A:
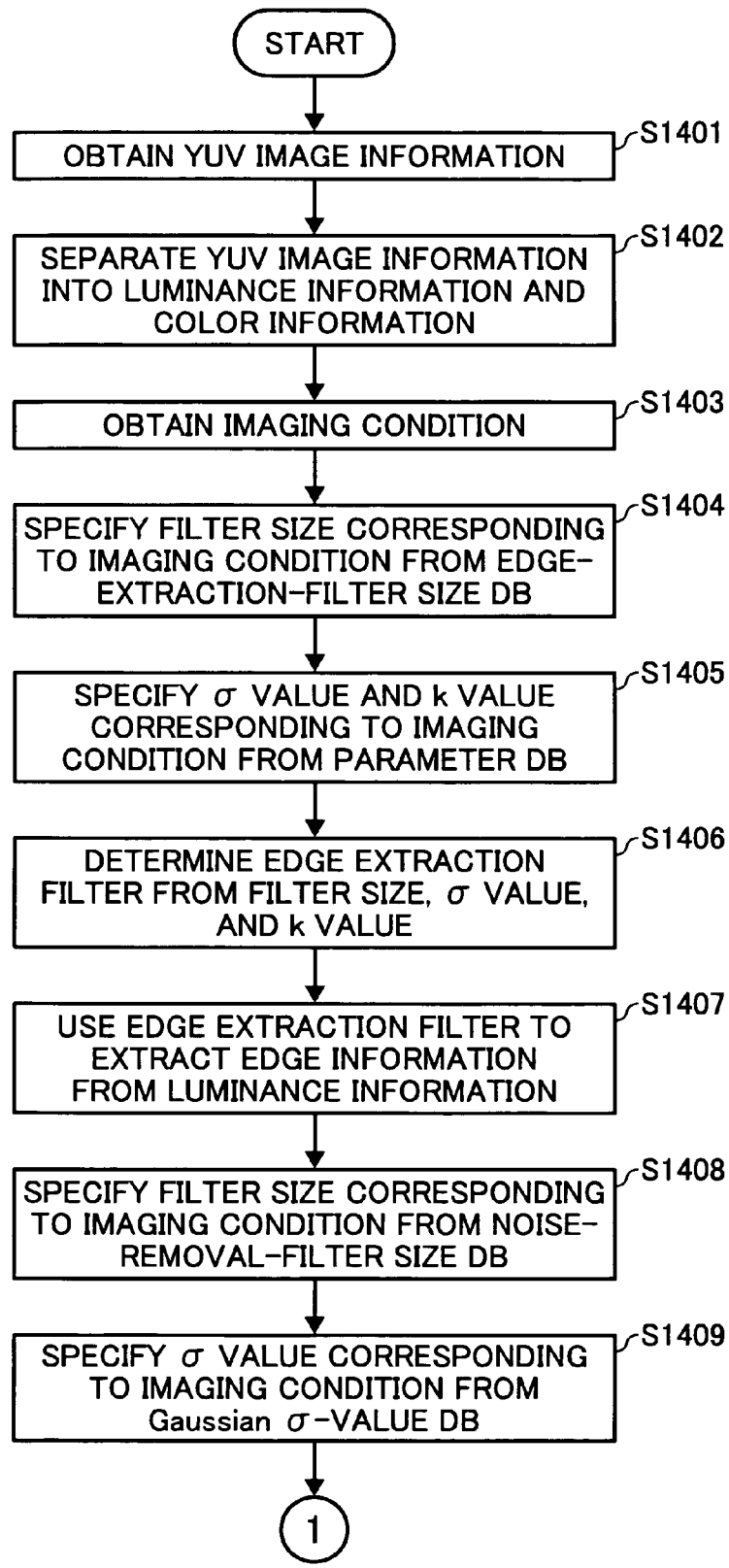
FIG. 14A is a flowchart of an image processing procedure performed by an image-information obtaining unit, a component separating unit, an imaging-condition obtaining unit, a filter determining unit, a scaling unit, a luminance-component edge extracting unit, a luminance-component noise removing unit, a color-component noise removing unit, an inverse scaling unit, an image-information synthesizing unit, an image-information compressing unit, and an image-information output unit.
Figure 14B:
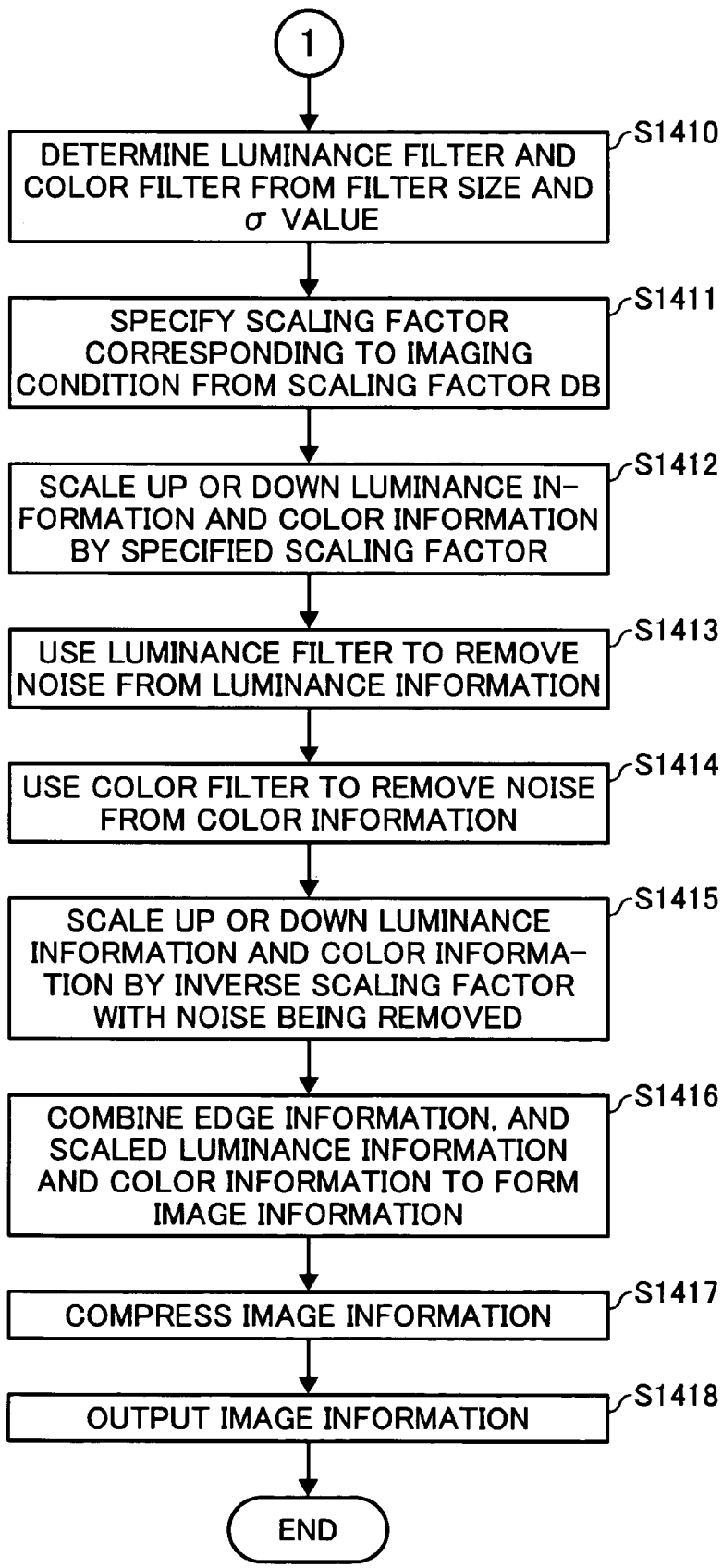
FIG. 14B is a flowchart of the image processing procedure performed by the image-information obtaining unit, the component separating unit, the imaging-condition obtaining unit, the filter determining unit, the scaling unit, the luminance-component edge extracting unit, the luminance-component noise removing unit, the color-component noise removing unit, the inverse scaling unit, the image-information synthesizing unit, the image-information compressing unit, and the image-information output unit.

Next, an image process by the image processing unit 200 configured as explained above is explained. FIGS. 14A and 14B are flowcharts of the image processing procedure performed by the image-information obtaining unit, the component separating unit, the imaging-condition obtaining unit, the filter determining unit, the scaling unit, the luminance-component edge extracting unit, the luminance-component noise removing unit, the color-component noise removing unit, the inverse scaling unit, the image-information synthesizing unit, the image-information compressing unit, and the image-information output unit.

The image processing procedure according to the second embodiment has common portions with that of the flowchart depicted in FIGS. 6A and 6B, and therefore only different portions are explained herein. For steps S1401 to S1410, the explanation in FIGS. 6A and 6B is referred to, and these steps are not explained herein.

At step S1411, the scaling unit 211 specifies a scaling factor corresponding to the imaging condition from the scaling factor database 260 (step S1411). A scaling factor is specified for each of the luminance information and the color information. The scaling unit 211 then performs scaling on the luminance information and the color information obtained through separation by the component separating unit 102 with respective scaling factors (step S1412).

The luminance-component noise removing unit 105 uses the luminance filter to remove noise from the luminance information subjected to scaling by the scaling unit 211 (step S1413). The color-component noise removing unit 106 uses the color filter to remove noise from the color information subjected to scaling by the scaling unit 211 (step S1414).

The inverse scaling unit 212 performs scaling on the luminance information with noise removed therefrom by the luminance-component noise removing unit 105 and the color information with noise removed therefrom by the color-component noise removing unit 106 each at an inverse scaling factor (step S1415).

The image-information synthesizing unit 107 combines the edge information, and the luminance information and color information subjected to scaling to form image information in YUV format (step S1416). The image-information compressing unit 108 compresses the image information in YUV format generated by the image-information synthesizing unit 107 to JPEG format (step S1417). The image-information output unit 109 outputs the image information compressed by the image-information compressing unit 108 to a memory card or the like (step S1418).

In this manner, even if the size of noise is increased due to an increase in sensitivity of the camera and therefore the size of the noise removal filter has to be increased, scaling is performed on the luminance information and the color information for a noise removal process, and then scaling is performed at an inverse scaling factor after processing. With this, the time required for the noise removal process can be reduced, thereby achieving an effective noise removal process at high speed.

A third embodiment of the present invention is explained below. In an image processing apparatus according to the third embodiment, edge extraction and noise removal of image information are performed in the image processing apparatus in place of an imaging device. Here, only different portions from those according to the first embodiment are explained.

Figure 15:
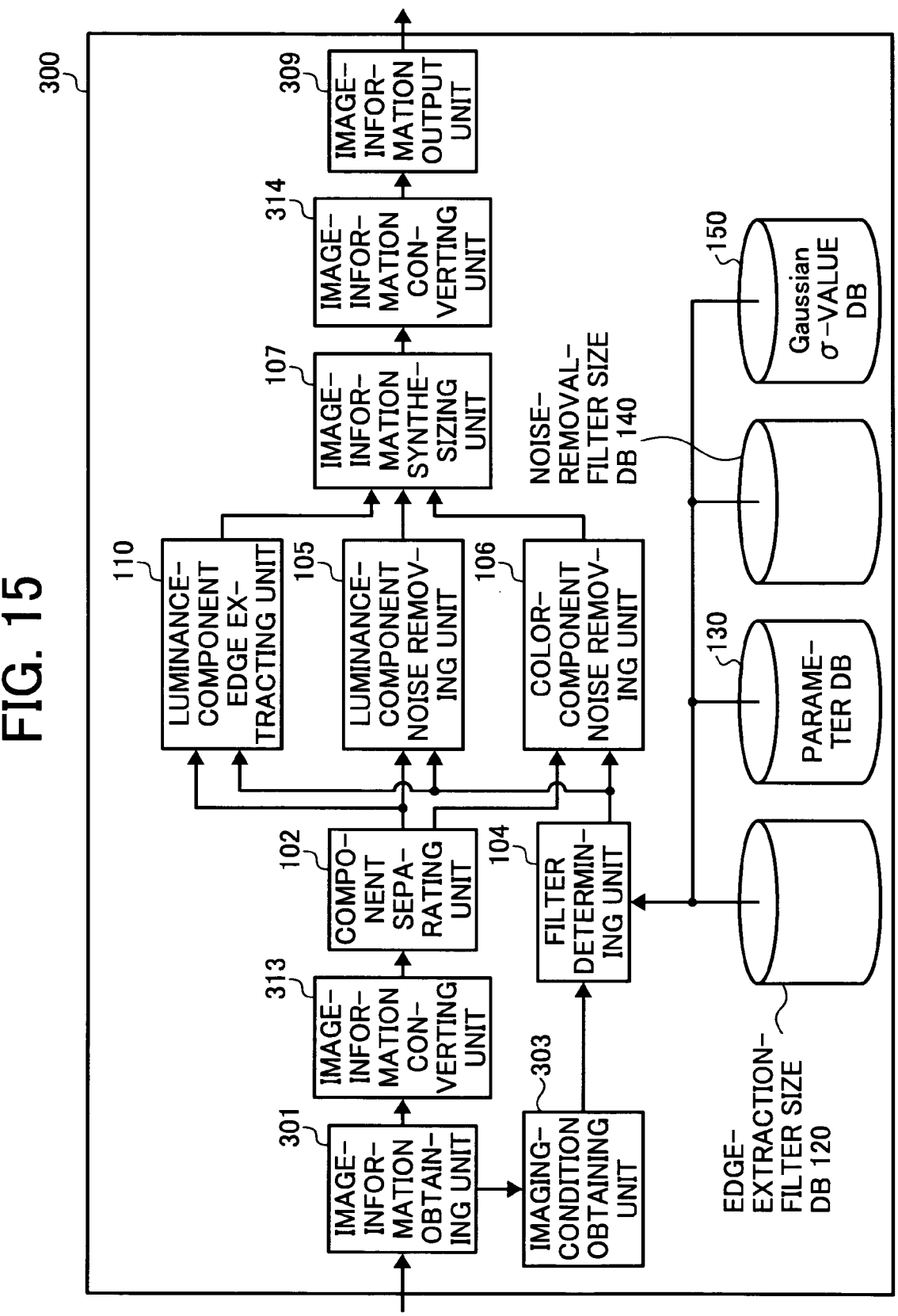
FIG. 15 is a block diagram of the configuration of an image processing apparatus according to a third embodiment of the present invention.

A configuration example of the image processing unit to which the present invention is applied is explained. FIG. 15 is a block diagram of the configuration of an image processing apparatus 300 according to the third embodiment. The image processing apparatus 300 includes an image-information obtaining unit 301, an image-information converting unit 313, the component separating unit 102, an imaging-condition obtaining unit 303, the filter determining unit 104, the luminance-component edge extracting unit 110, the luminance-component noise removing unit 105, the color-component noise removing unit 106, the image-information synthesizing unit 107, an image-information converting unit 314, an image-information output unit 309, the edge-extraction-filter size database 120, the parameter database 130, the noise-removal-filter size database 140, and the Gaussian σ-value database 150.

The configuration and function of the component separating unit 102, the filter determining unit 104, the luminance-component edge extracting unit 110, the luminance-component noise removing unit 105, the color-component noise removing unit 106, the image-information synthesizing unit 107, the edge-extraction-filter size database 120, the parameter database 130, the noise-removal-filter size database 140, and the Gaussian σ-value database 150 are similar to those in the first embodiment, and are not explained herein.

The image-information obtaining unit obtains image information stored in a storage medium or image information transmitted via a network. The image-information converting unit 313 converts the image information obtained by the image-information obtaining unit 301 to image information in YUV format.

The imaging-condition obtaining unit 303 obtains an imaging condition from the image information obtained by the image-information obtaining unit 301. The image-information converting unit 314 converts the image information in YUV format generated by the image-information synthesizing unit 107 to image information in another format. The image-information output unit 309 outputs the image information converted by the image-information converting unit 314 to an HDD or printer.

Figure 16B:
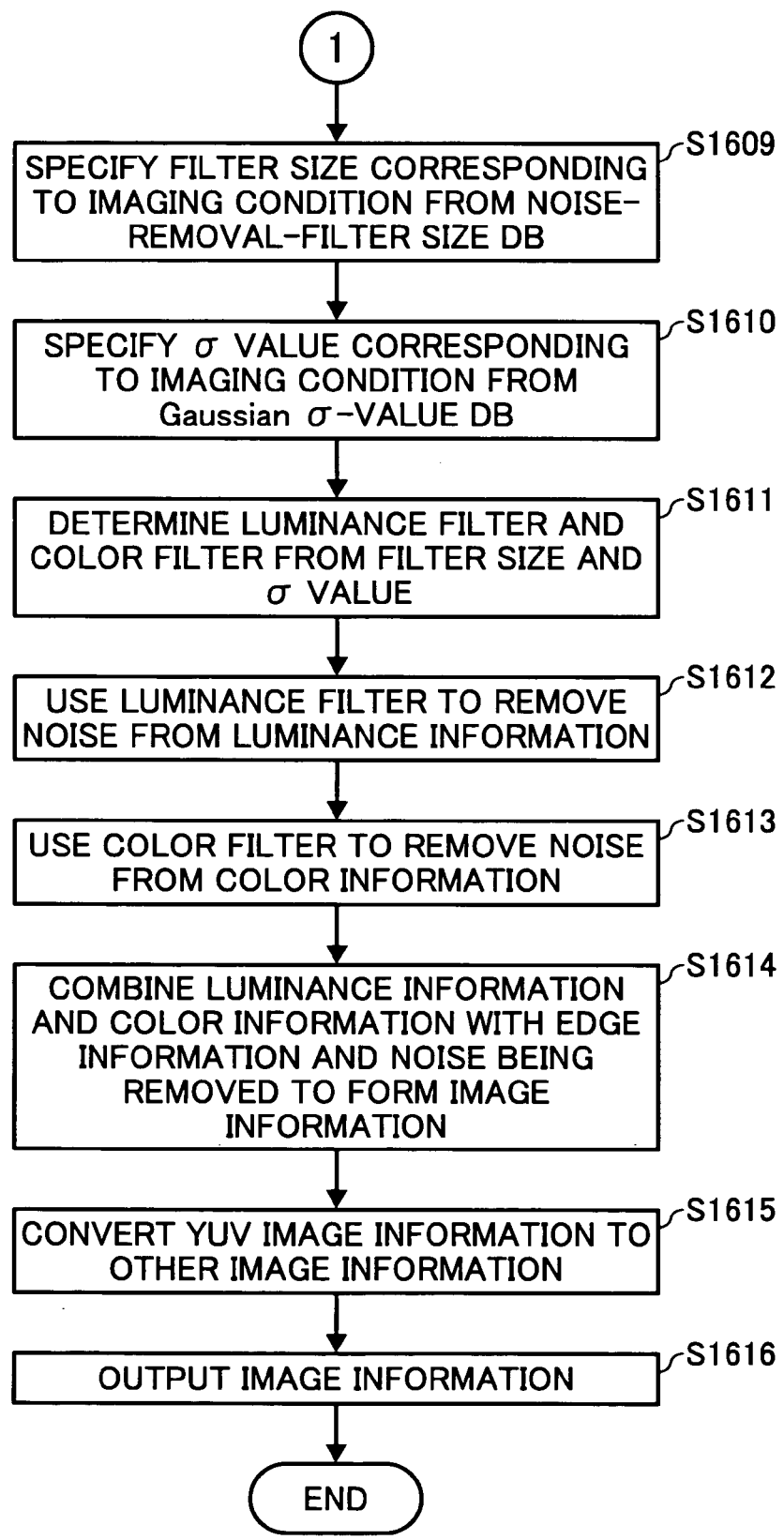
FIG. 16B is a flowchart of the image processing procedure performed by the image-information obtaining unit, the image-information converting unit, the component separating unit, the imaging-condition obtaining unit, the filter determining unit, the luminance-component edge extracting unit, the luminance-component noise removing unit, the color-component noise removing unit, the image-information synthesizing unit, the image-information converting unit, and the image-information output unit.

An image process by the image processing apparatus configured as explained above is explained. FIGS. 16A and 16B depict a flowchart of an image processing procedure performed by the image-information obtaining unit, the image-information converting unit, the component separating unit, the imaging-condition obtaining unit, the filter determining unit, the luminance-component edge extracting unit, the luminance-component noise removing unit, the color-component noise removing unit, the image-information synthesizing unit, the image-information converting unit, and the image-information output unit.

The image processing procedure according to the present embodiment is approximately similar to that of the flowchart depicted in FIGS. 6A and 6B, and therefore only different portions are explained herein. For steps S1605 to S1614, the explanation in FIGS. 6A and 6B is referred to, and these steps are not explained herein.

The image-information obtaining unit 301 obtains image information stored in a storage medium or image information transmitted through a network (step S1601). The image-information converting unit 313 converts the image information obtained by the image-information obtaining unit 301 to image information in YUV format (step S1602). For example, when the obtained image information is in RGB format, such image information is converted by the following conversion equation to image information in YUV format.

$$\begin{bmatrix} Y \\ U \\ V \end{bmatrix} = \begin{bmatrix} 0.299 & 0.587 & 0.114 \\ 0.5 & -0.419 & -0.081 \\ -0.169 & -0.332 & 0.5 \end{bmatrix} \begin{bmatrix} R \\ G \\ B \end{bmatrix} \quad (5)$$

The component separating unit 102 separates the converted image information in YUV format into luminance information and color information (step S1603). The imaging-condition obtaining unit 303 obtains an imaging condition(s) from the image information obtained by the image-information obtaining unit 301 (step S1604). For example, when the image information is in Exchangeable Image File Format (Exif), the image information additionally has recorded therein data of the imaging device, such as the manufacturer, model number, imaging sensitivity, and exposure time at shooting of the imaging device.

For explanation from step S1605 to S1614, the explanation of FIGS. 6A and 6B are referred to. The image-information converting unit 314 converts the image information in YUV format generated by the image-information synthesizing unit 107 to, for example, image information in RGB format (step S1615). When the image information in YUV format is converted to image information in RGB format, the following conversion equation is used for conversion.

$$\begin{bmatrix} R \\ G \\ B \end{bmatrix} = \begin{bmatrix} 1.0 & 1.402 & 0 \\ 1.0 & -0.174 & -0.344 \\ 1.0 & 0 & 1.772 \end{bmatrix} \begin{bmatrix} Y \\ U \\ V \end{bmatrix} \quad (6)$$

The image-information output unit 309 outputs the image information obtained through conversion by the image-information converting unit 314 to a storage medium or printer (step S1616).

In this manner, even in the image processing apparatus, the image information in YUV format is separated into luminance information and color information; edge information is extracted from the luminance information; noise is removed from the luminance information and color information; and the edge information, the luminance information, and the color information are combined. With this, noise can be effectively removed with edge blurring being suppressed too keep high image quality. Also, noise is removed by using a filter suitable for each of the luminance information and the color information obtained through separation. With this, effective noise removal can be performed in consideration of the property of human eyes.

The scaling process explained in the second embodiment may be incorporated in the present embodiment. With this, even in the image processing apparatus, even if the size of noise is increased due to an increase in imaging sensitivity and therefore the size of the noise removal filter has to be increased, scaling is performed on the luminance information and the color information for a noise removal process, and then scaling is performed at an inverse scaling factor after processing. With this, the time required for the noise removal process can be reduced, thereby achieving an effective noise removal process at high speed.

Figure 17:
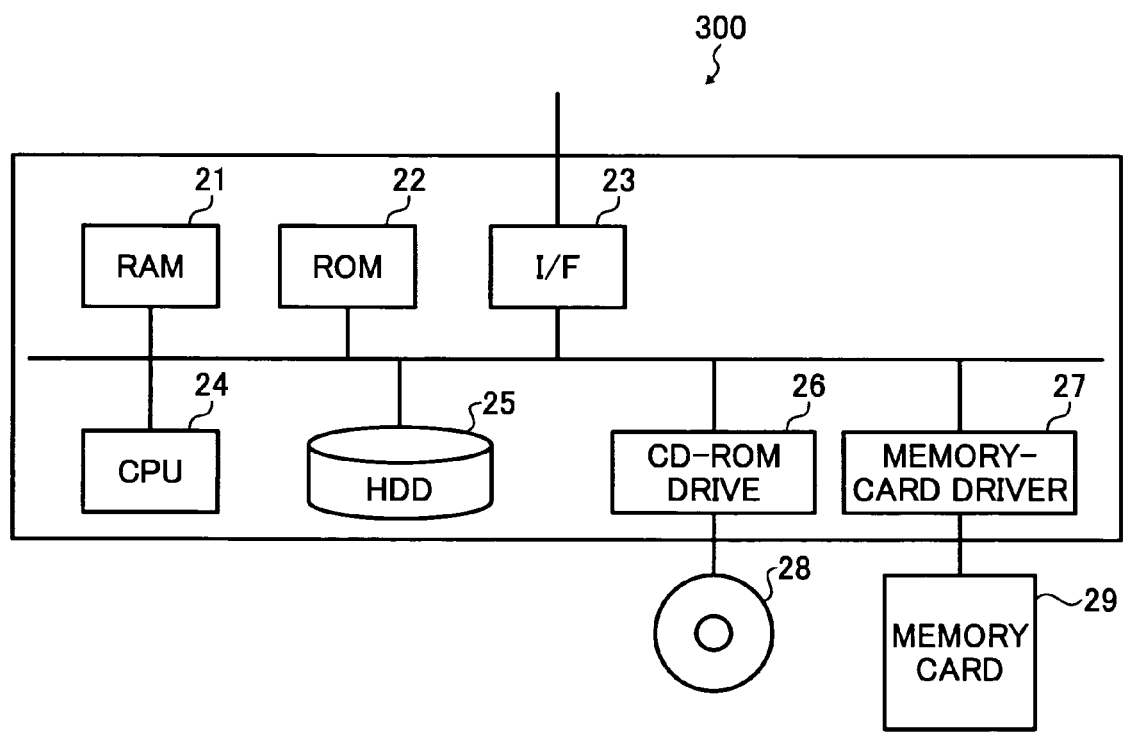
FIG. 17 is a block diagram of a hardware configuration of an image processing apparatus according to the third embodiment.

FIG. 17 is a block diagram of a hardware configuration of the image processing apparatus according to the third embodiment. The image processing apparatus 300 includes a CPU 24 that centrally controls each component. The CPU 24 has connected via a bus thereto a ROM 22 having stored therein a Basic Input Output System (BIOS) and others and a RAM 21 that rewritably stores various data and functions as a work area for the CPU, thereby forming a microcomputer. Furthermore, the bus has connected thereto an HDD 25 having stored therein a control program, a CD-ROM drive 26 that reads a CD-ROM 28, and an interface (I/F) 23, which is an interface for communication with a printer unit or the like.

The CD-ROM 28 depicted in FIG. 17 has stored therein a predetermined control program. The CPU 24 reads at the CD-ROM drive 26 the control program stored in the CD-ROM 28, and then installs the program on the HDD 25. With this, various processes as explained above can be performed. Also, a memory card 29 has stored therein image information and others, which is read by a memory-card driver 27.

As a storage medium, not only a CD-ROM or a memory card but also various types of media can be used, such as various optical disks including a DVD, various magneto-optical disks, various magnetic disks including flexible disks, and semiconductor memories. Also, the program may be downloaded over a network, such as the Internet, and may be installed on the HDD 25. In this case, a storage device that has stored therein the program at a server on a transmitting side is also a storage medium according to one embodiment of the present invention. Here, the program may operate on a predetermined Operating System (OS). In this case, a part of various processes which will be explained further below may be executed by the OS, or may be included in a predetermined application software, such as a word processor software, or as a part of a group of program files forming the OS or the like.

As with the first embodiment, the edge-extraction-filter size database 120, the parameter database 130, the noise-removal-filter size database 140, and the Gaussian σ-value database 150 can be configured by any storage medium generally used, such as a HDD, an optical disk, and a memory card.

Also, the image processing program to be executed on the image processing apparatus according to the present embodiment may be stored on a computer connected to a network, such as the Internet, and may be downloaded via the network for provision. Also, the image processing program to be executed on the image processing apparatus according to the present embodiment may be provided or distributed via the network, such as the Internet.

Furthermore, the image processing program according to the present embodiment may be incorporated in advance in the ROM or the like for provision.

The image processing program to be executed on the image processing apparatus according to the present embodiment is recorded in an installable or an executable format on a computer-readable storage medium, such as a CD-ROM, FD, CD-R, or DVD, for provision.

The image processing program to be executed on the image processing apparatus according to the third embodiment has a module structure including each of the components (the image-information obtaining unit, the image-information converting unit, the component separating unit, the imaging-condition obtaining unit, the filter determining unit, the luminance-component edge extracting unit, the luminance-component noise removing unit, the color-component noise removing unit, the image-information synthesizing unit, the image-information output unit, and others). As actual hardware, with the CPU (processor) reading the image processing program from the storage medium for execution, each of the units, that is, the image-information obtaining unit, the image-information converting unit, the component separating unit, the imaging-condition obtaining unit, the filter determining unit, the luminance-component edge extracting unit, the luminance-component noise removing unit, the color-component noise removing unit, the image-information synthesizing unit, the image-information output unit, and others, is loaded and generated onto a main storage device.

Figure 18:
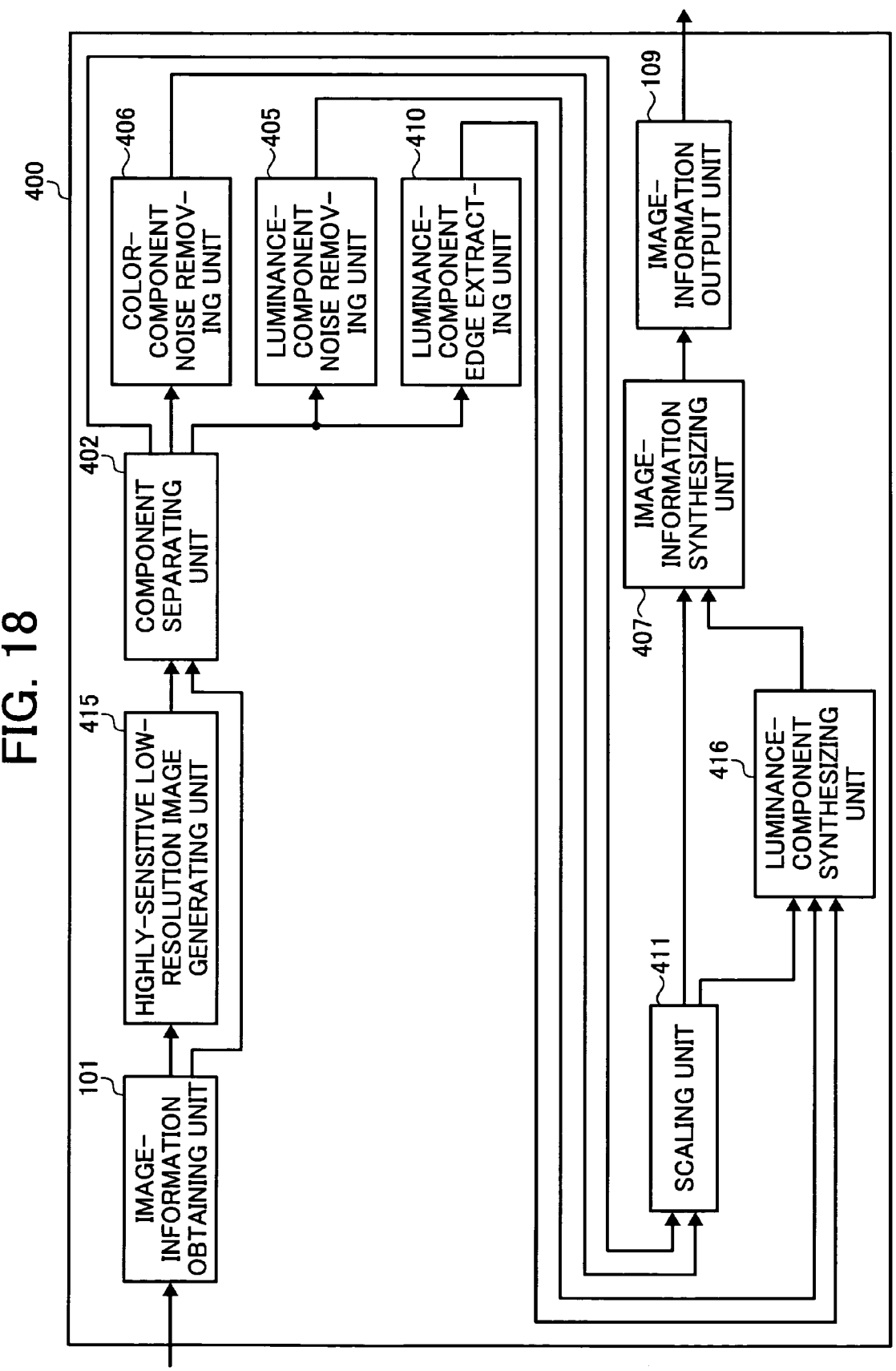
FIG. 18 is a block diagram of an image processing unit according to a fourth embodiment of the present invention.

A fourth embodiment of the present invention is explained below. First, a configuration example of an image processing unit included in a digital camera to which the present invention is applied is explained. FIG. 18 is a block diagram of an image processing unit 400 according to the fourth embodiment.

The image processing unit 400 includes the image-information obtaining unit 101, a highly-sensitive low-resolution image generating unit 415, a component separating unit 402, a color-component noise removing unit 406, a luminance-component noise removing unit 405, a luminance-component edge extracting unit 410, a scaling unit 411, a luminance-component synthesizing unit 416, an image-information synthesizing unit 407, and the image-information output unit 109. The configuration and function of the image-information obtaining unit 101 and the image-information output unit 109 are similar to those according to the first embodiment, and therefore not explained herein.

The highly-sensitive low-resolution image generating unit 415 adds pixel values of a plurality of adjacent pixels in the image information obtained by the image-information obtaining unit 101 to calculate one pixel value, thereby generating highly-sensitive low-resolution image information from the obtained image information. For example, when four adjacent pixel values are added, the number of pixels becomes one quarter. However, the amount of light per pixel becomes four fold, and therefore the sensitivity becomes four fold. Here, the number of pixels for adding their pixel values is not restricted to four. Also, the shape formed by the pixels for adding their pixel values is not restricted to a square, but may be any one of various polygons, a straight line, or a polygonal line.

The component separating unit 402 separates the highly-sensitive low-resolution image information generated by the highly-sensitive low-resolution image generating unit 415 into luminance information and color information. Also, the component separating unit 402 separates the image information obtained by the image-information obtaining unit 101 into luminance information and color information. Here, the image information obtained by the image-information obtaining unit 101 is low-sensitive high-resolution image information with respect to the highly-sensitive low-resolution image information generated by adding the pixel values.

The color-component noise removing unit 406 uses a filter stored in the apparatus to remove noise from the color information. Here, as the filter, in addition to the filter stored in the apparatus, as explained in the first embodiment, a Gaussian smoothing filter may be calculated from the σ value corresponding to the imaging condition, and the calculated filter may be used to remove noise from the color information.

The luminance-component noise removing unit 405 uses a filter stored in the apparatus to remove noise from the luminance information. Here, as the filter, in addition to the filter stored in the apparatus, as explained in the first embodiment, a Gaussian smoothing filter may be calculated from the σ value corresponding to the imaging condition, and the calculated filter may be used to remove noise from the luminance information.

The luminance-component edge extracting unit 410 uses a filter stored in the apparatus to extract edge information from the luminance information. Here, as the filter, in addition to the filter stored in the apparatus, as explained in the first embodiment, a Laplacian of Gaussian (LoG) filter may be calculated from the σ value and κ value corresponding to the imaging condition, and the calculated filter may be used to extract edge information.

The scaling unit 411 performs scaling on the color information with noise removed therefrom by the color-component noise removing unit 406, and also performs scaling on the luminance information obtained through separation by the component separating unit 402. For example, the highly-sensitive low-resolution image generating unit 415 adds four pixel values to calculate one pixel value to generate highly-sensitive low-resolution image information, and when the image size becomes one quarter, each of the pixel values is scaled up four times so that the image has the original image size.

The luminance-component synthesizing unit 416 synthesizes luminance information from the luminance information subjected to scaling by the scaling unit 411, the luminance information with noise removed therefrom by the luminance-component noise removing unit 405, and the edge information extracted from the luminance-component edge extracting unit 410.

The image-information synthesizing unit 407 synthesizes image information from the color information subjected to scaling by the scaling unit 411 and the luminance information synthesized by the luminance-component synthesizing unit 416.

Figure 19:
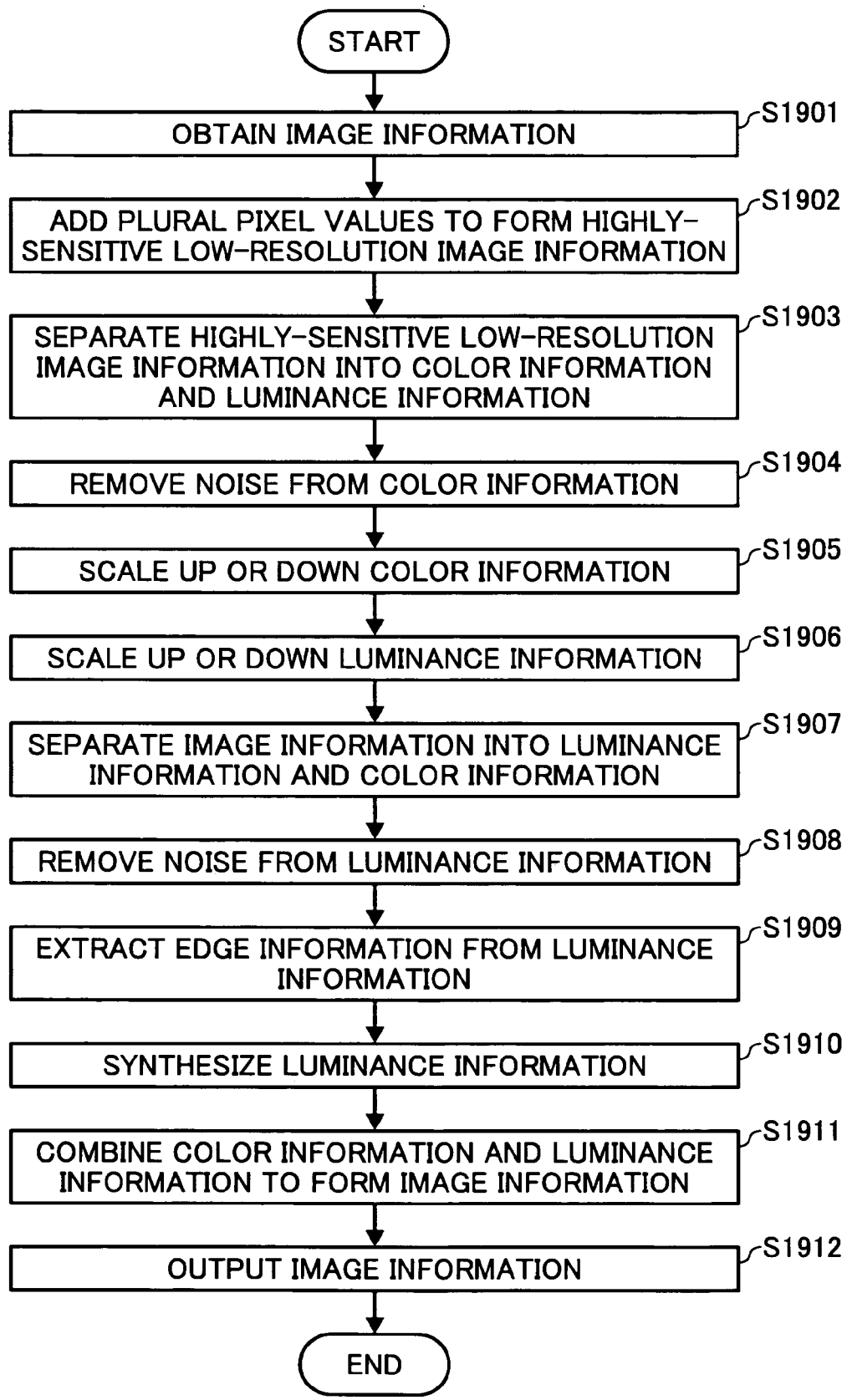
FIG. 19 is a flowchart of an image processing procedure performed by an image-information obtaining unit, a highly-sensitive low-resolution image generating unit, a component separating unit, a luminance-component edge extracting unit, a luminance-component noise removing unit, a color-component noise removing unit, a scaling unit, a luminance-component synthesizing unit, an image-information synthesizing unit, and an image-information output unit.

Next, an image process by the image processing unit 400 configured as mentioned above is explained. FIG. 19 is a flowchart of an image processing procedure performed by the image-information obtaining unit, the highly-sensitive low-resolution image generating unit, the component separating unit, the color-component noise removing unit, the luminance-component noise removing unit, the luminance-component edge extracting unit, the scaling unit, the luminance-component synthesizing unit, the image-information synthesizing unit, and the image-information output unit.

First, the image-information obtaining unit 101 obtains image information from temporary-storage memory (step S1901). The highly-sensitive low-resolution image generating unit 415 adds adjacent pixel values in the image information to generate highly-sensitive low-resolution image information (step S1902). With this, the number of pixel values is reduced, but the amount of exposure per pixel is increased. The component separating unit 402 separates the highly-sensitive low-resolution image information into color information (CrCb signal) and luminance information (Y signal) (step S1903). The color-component noise removing unit 406 removes noise from the color information obtained through separation (step S1904). For the noise removal process herein, a low-pass filter (for example, a smoothing filter) is used. FIG. 20 is a drawing for illustrating an example of a smoothing filter with a filter size of 3×3.

The scaling unit 411 performs scaling on the color information with noise removed therefrom to the original image size (step S1905). The scaling unit 411 performs scaling on the luminance information obtained through separation to the original image size (step S1906). With this, the luminance information obtained through separation from the highly-sensitive low-resolution image information generated by adding pixel values and the color information obtained through separation from the highly-sensitive low-resolution image information and further with noise removed therefrom have an image size before adding the pixel values.

The component separating unit 402 separates the image information obtained by the image-information obtaining unit 101 into the luminance information (Y signal) and the color signal (CrCb signal) (step S1907). The luminance-component noise removing unit 405 removes noise from the luminance information obtained through separation (step S1908). For the noise removal process, as with the process in the color-component noise removing unit 406, a low-pass filter (for example, the smoothing filter depicted in FIG. 20) is used.

Figure 22:
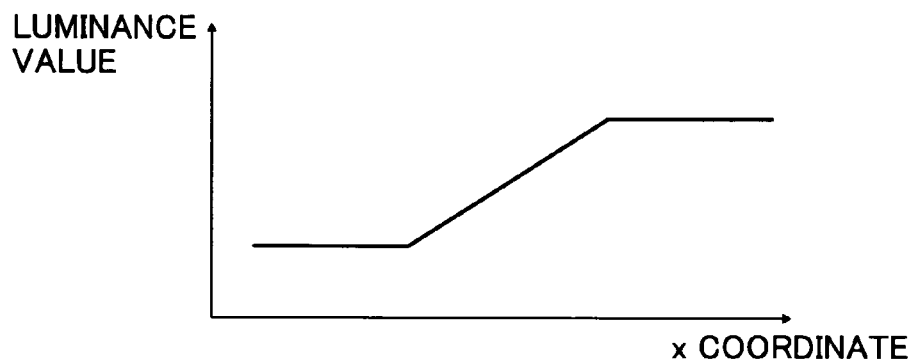
FIG. 22 is a graph for illustrating separated luminance information.
Figure 23:
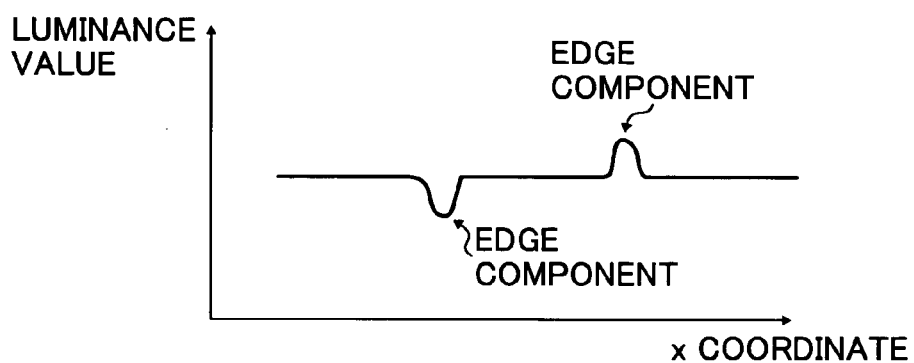
FIG. 23 is a graph for illustrating the results obtained by extracting an edge from the luminance information.

Also, the luminance-component edge extracting unit 410 extracts edge information from the luminance information obtained through separation (step S1909). Here, for the edge extraction process, a LoG filter is used as an edge extraction filter. The filter can be calculated by using the equation (1) mentioned above. FIG. 21 is a drawing for illustrating an example of an edge extraction filter with a filter size of 5×5. Also, for the edge-component extraction process, the equation (3) mentioned above is used. FIG. 22 is a graph for illustrating separated luminance information. FIG. 23 is a graph for illustrating the results obtained by extracting an edge from the luminance information. In this manner, when edges are extracted from the luminance information as depicted in FIG. 22 by using the edge extraction filter as depicted in FIG. 21, edge components as depicted in FIG. 23 are extracted.

Figure 24:
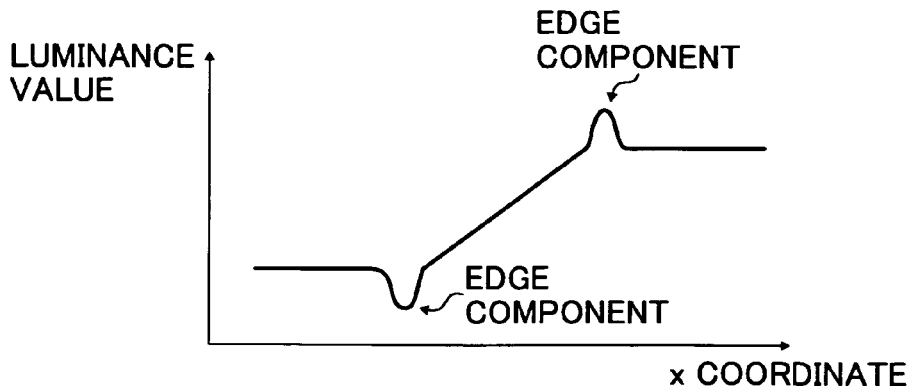
FIG. 24 is a graph for illustrating the results obtained by combining the luminance information and the edge information.

The luminance-component synthesizing unit 416 synthesizes luminance information from the luminance information obtained through separation from the highly-sensitive low-resolution image information and subjected to scaling, the luminance information with noise removed therefrom, and the edge information (step S1910). FIG. 24 is a graph for illustrating the results obtained by combining the luminance information and the edge information. Edge components are extracted as depicted in FIG. 24, and are combined with the luminance information obtained through separation from the highly-sensitive low-resolution image information and subjected to scaling and the luminance information with noise removed therefrom. With this, an image with high quality can be obtained without decreasing resolution of the image. The image-information synthesizing unit 407 synthesizes image information from the color information obtained through separation from the highly-sensitive low-resolution image information and subjected to scaling and the synthesized luminance information (step S1911). The image-information output unit 109 outputs the synthesized image information (step S1912). Here, the processes at steps S1907 to S1909 and the processes at steps S1902 to S1906 may be concurrently performed.

In this manner, image information is synthesized from the luminance information from the highly-sensitive low-resolution image information, the color information with noise removed therefrom, the luminance information from the highly-sensitive low-resolution image information with noise removed therefrom, and the edge information. With this, noise can be removed even when exposure time is short at the time of imaging, thereby obtaining image information with excellent color reproducibility and white balance and also with an excellent balance between color and luminance of the image.

The luminance information separated from the highly-sensitive low-resolution image information is subjected to scaling and is combined to the image information, thereby suppressing noise of the synthesized image. That is, if the luminance value of the image information is used as it is, since the luminance value of the image information is low, the luminance value of the image information has to be amplified to be increased. With this, noise is also enhanced. On the other hand, the luminance information of the highly-sensitive low-resolution image is combined, the scaling factor of the amplification on the image information can be reduced. Therefore, the magnification factor of the noise is reduced, and noise components of the synthesized image are reduced. As a result, noise of the synthesized image can be reduced.

According to the fourth embodiment, an image is shot by the imaging unit, and by using one piece of image information stored in temporary-storage memory, highly-sensitive low-resolution image information and low-sensitive high-resolution image information are generated. Alternatively, highly-sensitive low-resolution image information and low-sensitive high-resolution image information may be generated by using two pieces of image information obtained by shooting an image twice by the imaging unit. At this time, two pieces of image information may be generated with the same exposure time. Alternatively, two pieces of image information may be generated with different exposure times, and image information with a long exposure time may be used to generate highly-sensitive low-resolution image information, and image information with a short exposure time may be used to generate low-sensitive high-resolution image information.

Next, a hardware configuration of a digital camera, which is one example of an imaging device that performs the image process, is explained. The hardware configuration of the digital camera is approximately similar to that in FIG. 11. Therefore, FIG. 11 and its explanation are referred to, and only different portions are explained herein.

The CCD 3 converts an optical image formed on an imaging surface to an electric signal for output as analog image information. In the image processing unit 400 explained above, image information shot once is used to generate highly-sensitive low-resolution image information and low-sensitive high-resolution image information. Alternatively, image information may be sequentially output through two exposures, and the output image information may be used. In this case, a process of adding pixel values to one piece of image information exposed. The image information output from the CCD 3 has noise components removed by the CDS circuit 4, is converted by the A/D converter 5 to a digital value, and is then output to the image processing circuit 8. Here, noise removal is performed by a circuit, and is different from noise removal through image processing.

The image processing circuit 8 uses the SDRAM 12 that temporarily stores image information to perform various image processes, including YCrCb conversion, white balance control, contrast correction, edge enhancement, and color conversion. Here, white balance control is an image process of adjusting color density of the image information, whilst contrast correction is an image process of adjusting contrast of the image information. Edge enhancement is an image process of adjusting sharpness of the image information, whilst color conversion is an image process of adjusting shades of color of the image information. Also, the image processing circuit 8 causes the image information subjected to signal processing and image processing to be displayed on the LCD 16.

When the digital camera performs a highly-sensitive-image synthesizing process, a system controller loads an image processing program from the ROM 11 to the RAM 10 for execution. The image processing program accesses the YCrCb image temporarily stored in the SDRAM to obtain, via the system controller, parameters and filters for color-component noise removal, luminance-component noise removal, and luminance-component edge extraction for performing these processes.

The image processing program to be executed on the digital camera according to the present embodiment has a module structure including each of the components (the image-information obtaining unit, the highly-sensitive low-resolution image generating unit, the component separating unit, the color-component noise removing unit, the scaling unit, the luminance-component edge extracting unit, the luminance-component noise removing unit, the luminance-component synthesizing unit, the image-information synthesizing unit, the image-information output unit, and others). As actual hardware, with the CPU (processor) reading the image processing program from the storage medium for execution, each of the units, that is, the image-information obtaining unit, the highly-sensitive low-resolution image generating unit, the component separating unit, the color-component noise removing unit, the scaling unit, the luminance-component edge extracting unit, the luminance-component noise removing unit, the luminance-component synthesizing unit, the image-information synthesizing unit, the image-information output unit, and others, is loaded and generated onto a main storage device.

Figure 25:
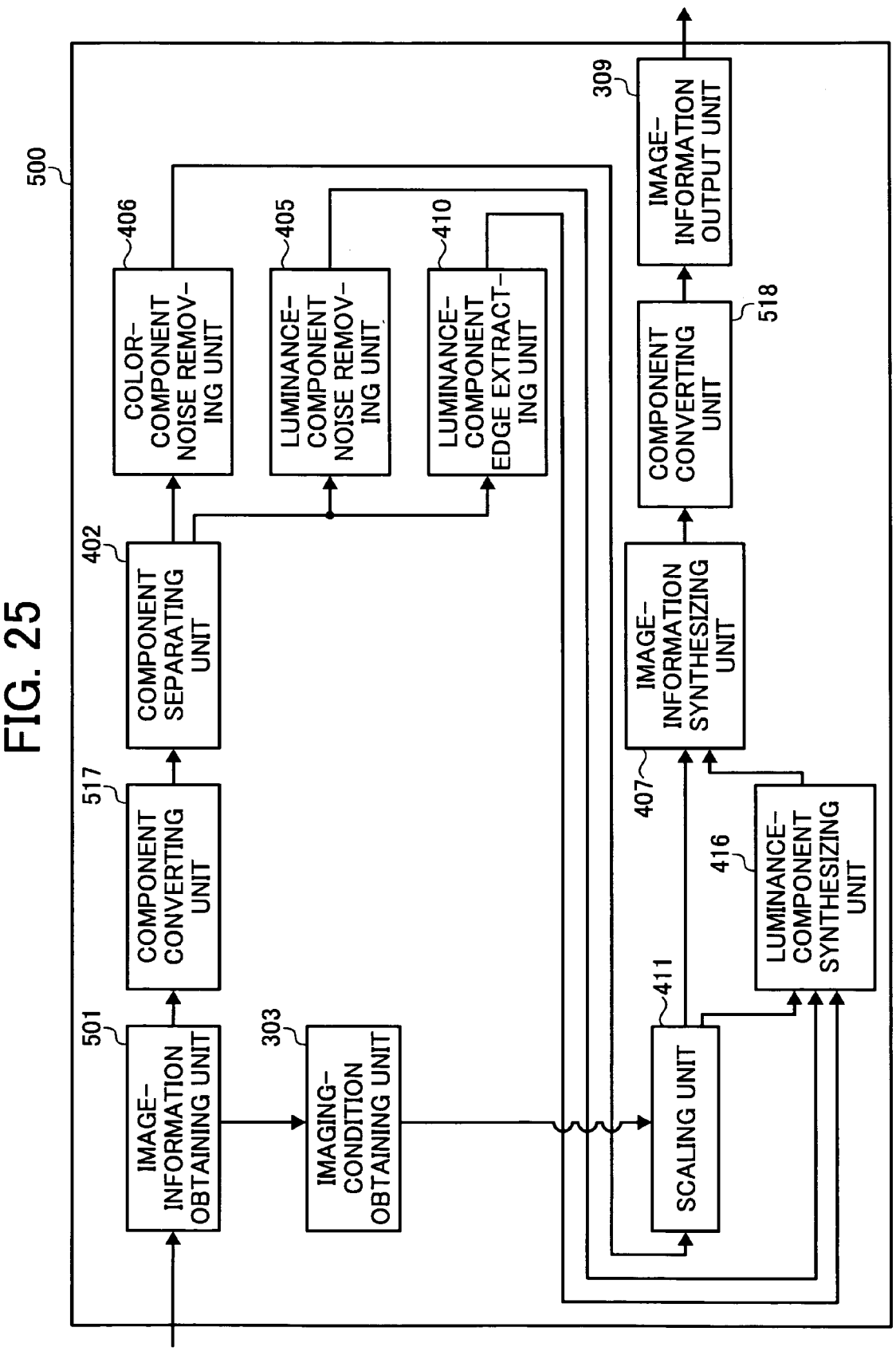
FIG. 25 is a block diagram of the configuration of an image processing apparatus according to a fifth embodiment of the present invention.

With reference to the attached drawings, a fifth embodiment is explained. First, a configuration example of an image processing apparatus to which the present invention is applied is explained. FIG. 25 is a block diagram of the configuration of an image processing apparatus 500 according to the fifth embodiment.

The image processing apparatus 500 according to the present embodiment includes an image-information obtaining unit 501, a component converting unit 517, the component separating unit 402, the color-component noise removing unit 406, the scaling unit 411, the luminance-component noise removing unit 405, the luminance-component edge extracting unit 410, the luminance-component synthesizing unit 416, the image-information synthesizing unit 407, a component converting unit 518, the imaging-condition obtaining unit 303, and the image-information output unit 309. Here, the configuration and function of the component separating unit 402, the color-component noise removing unit 406, the scaling unit 411, the luminance-component noise removing unit 405, the luminance-component edge extracting unit 410, the luminance-component synthesizing unit 416, and the image-information synthesizing unit 407 are similar to those in the fourth embodiment. Also, the configuration and function of the imaging-condition obtaining unit 303 and the image-information output unit 309 are similar to those in the third embodiment. Therefore, these components are not explained herein.

The image-information obtaining unit 501 obtains highly-sensitive low-resolution image information and low-sensitive high-resolution image information stored in memory. The highly-sensitive low-resolution image information is generated in a manner similar to that of the fourth embodiment by adding pixel values of a plurality of pixels of the image information shot by the imaging unit. In the present embodiment, an imaging condition(s), such as the number of pixels for adding their pixel values at shooting, is added to the highly-sensitive low-resolution image information generated by performing a pixel-value addition process at shooting. For example, the highly-sensitive low-resolution image information is stored in a memory card of a digital camera. Also, the shot image information (low-sensitive high-resolution image information) is stored with the imaging condition added thereto. For example, when the image information is in Exif format, the imaging condition added to the image information includes the manufacturer, model number, imaging sensitivity, and the number of pixels for adding their pixel values at shooting of the imaging device. Here, the image size of the highly-sensitive low-resolution image information is reduced due to addition of pixel values, and the image size of the low-sensitive high-resolution image is a normal size.

The component converting unit 517 converts image information in RGB format to image information in YCrCb format. The component converting unit 518 converts image information in YCrCb format to image information in RGB format.

Figure 26:
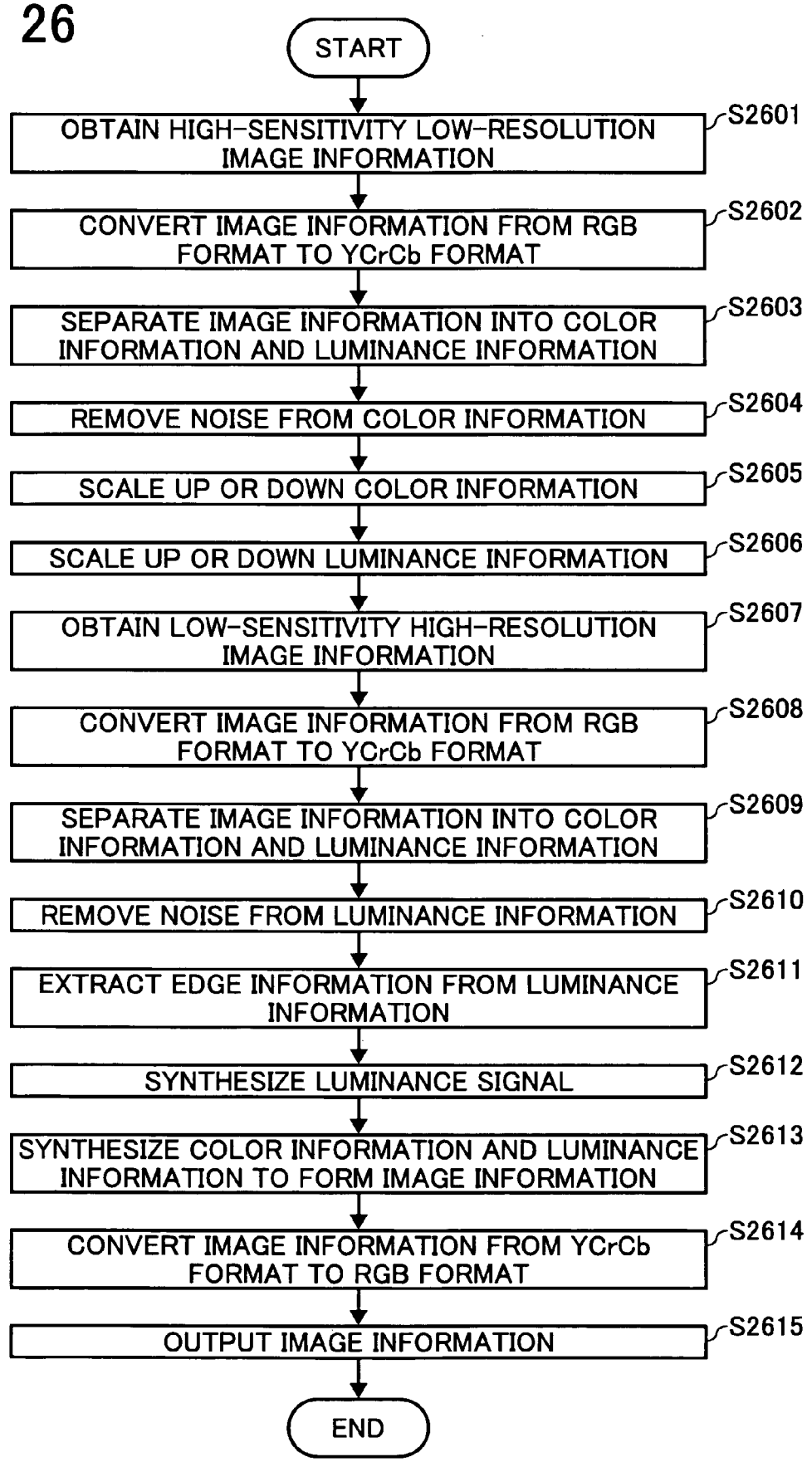
FIG. 26 is a flowchart of an image processing procedure performed by an image-information obtaining unit, a component converting unit, a component separating unit, a color-component noise removing unit, a scaling unit, a luminance-component noise removing unit, a luminance-component edge extracting unit, a luminance-component synthesizing unit, an image-information synthesizing unit, and an image-information output unit.

Next, an image process by the image processing apparatus 500 configured as mentioned above is explained. FIG. 26 is a flowchart of an image processing procedure performed by the image-information obtaining unit, the component converting unit, the component separating unit, the color-component noise removing unit, the scaling unit, the luminance-component noise removing unit, the luminance-component edge extracting unit, the luminance-component synthesizing unit, the image-information synthesizing unit, and the image-information output unit.

The procedure according to the fifth embodiment is approximately similar to that in the flowchart depicted in FIG. 19. Therefore, only different portions are explained. For steps S2609 to S2612, the explanation with reference to FIG. 19 is referred to, and these steps are not explained herein.

First, the image-information obtaining unit 501 obtains the highly-sensitive low-resolution image information in RGB format from memory (step S2601). Since the highly-sensitive low-resolution image information includes the imaging condition(s), the number of pixels for adding their pixel values at shooting is also obtained, for example. The component converting unit 517 converts the image information in RGB format to image information in YCrCb format (step S2602). The component separating unit 402 separates the highly-sensitive low-resolution image information into color information (CrCb signal) and luminance information (Y signal) (step S2603). The color-component noise removing unit 406 removes noise from the color information obtained through separation (step S2604).

The scaling unit 411 uses the number of pixels for adding their pixel values obtained as an imaging condition to perform scaling on the color information with noise removed therefrom to the original size (step S2605). Also, the scaling unit 411 uses the number of pixels for adding their pixel values obtained as an imaging condition to perform scaling on the luminance information obtained through separation to the original size (step S2606). With this, the luminance information obtained through separation from the highly-sensitive low-resolution image information generated by adding the pixel values and the color information with noise removed therefrom have the original image size before adding the pixel values.

The image-information obtaining unit 501 obtains the low-sensitive high-resolution image information in RGB format from memory (step S2607). Since the low-sensitive high-resolution image information includes the imaging condition(s), the imaging condition is also obtained. The component converting unit 517 converts the image information in RGB format to image information in YCrCb format (step S2608). For steps S2609 to S2612, refer to the explanation of FIG. 19.

The image-information synthesizing unit 407 synthesizes image information from the color information obtained through separation and subjected to scaling and the synthesized luminance information (step S2613). The component converting unit 518 converts the image information in YCrCb format to image information in RGB format (step S2614). The image-information output unit 309 outputs the image information obtained through conversion to a storage medium or printer (step S2615). Here, the processes at steps S2607 to S2611 may be performed concurrently with the processes at steps S2601 to S2606.

In this manner, even in the image processing apparatus, image information is synthesized from the luminance information from the highly-sensitive low-resolution image information, the color information with noise removed therefrom, the luminance information from the highly-sensitive low-resolution image information with noise removed therefrom, and the edge information. With this, noise can be removed even when exposure time is short at the time of imaging, thereby obtaining image information with excellent color reproducibility and white balance and also image with an excellent balance between color and luminance of the image.

According to the fifth embodiment, the process is explained starting from adding pixel values at shooting to generate highly-sensitive low-resolution image information and obtaining the highly-sensitive low-resolution image information and the low-sensitive high-resolution image information stored in memory. Alternatively, as with the fourth embodiment, one shot piece of image information may be stored in memory, and the process of adding pixel values may be performed as image processing to generate highly-sensitive low-resolution image information. Still alternatively, two pieces of image information may be shot by the imaging unit, the process of adding pixel values may be performed on one of these pieces of image information, and then the image processing explained above may be performed.

The hardware configuration of the image processing apparatus according to the present embodiment is explained. Since the hardware configuration of the image processing apparatus is approximately similar to that in FIG. 17 explained above, FIG. 17 and its explanation are referred to.

In the foregoing, while the present invention has been explained by using the first to fifth embodiments, various modifications and improvements can be made to the embodiments explained above. Here, the configurations and functions explained in the first to fifth embodiments explained above can be freely combined.

As described above, according to one embodiment of the present invention, the previously-extracted edge information is combined to generate image information. Therefore, an effect can be achieved such that an image with high quality and less edge blurring can be obtained.

Furthermore, according to another embodiment of the present invention, the edge information is extracted by a general filtering process. Therefore, an effect can be achieved such that an edge extraction process can be easily performed.

Moreover, according to still another embodiment of the present invention, an effect can be achieved such that an image with high quality and less edge blurring can be obtained.

Furthermore, according to still another embodiment of the present invention, the edge information is extracted by a filter found based on the σ value and κ value corresponding to the imaging condition. Therefore, an effect can be achieved such that an image with high quality and less edge blurring can be obtained.

Moreover, according to still another embodiment of the present invention, the edge information is extracted by a filter corresponding to the imaging condition. Therefore, an effect can be achieved such that an image with high quality and less edge blurring can be obtained.

Furthermore, according to still another embodiment of the present invention, edge extraction suited for the image quality level can be performed. Therefore, an effect can be achieved such that an image with high quality and less edge blurring can be obtained.

Moreover, according to still another embodiment of the present invention, edge extraction suited for the image quality level can be performed. Therefore, an effect can be achieved such that an image with high quality and less edge blurring can be obtained.

Furthermore, according to still another embodiment of the present invention, edge extraction suited for the image quality level can be performed. Therefore, an effect can be achieved such that an image with high quality and less edge blurring can be obtained.

Moreover, according to still another embodiment of the present invention, a noise removal process is performed after scaling up or down the luminance information and the color information. Therefore, an effect can be achieved such that the time for the noise removal process can be reduced.

Furthermore, according to still another embodiment of the present invention, the sensitivity of the image information is increased. Therefore, an effect can be achieved such that a high-quality image with excellent color reproducibility and white balance can be obtained.

Moreover, according to still another embodiment of the present invention, noise is removed from the highly-sensitive low-resolution color information. Therefore, an effect can be achieved such that an image with high quality and less edge blurring can be obtained.

Furthermore, according to still another embodiment of the present invention, the previously-extracted edge information is combined to generate image information. Therefore, an effect can be achieved such that an image with high quality and less edge blurring can be obtained.

Moreover, according to still another embodiment of the present invention, the sensitivity of the image information imaged can be improved. Therefore, an effect can be achieved such that a high-quality image with excellent color reproducibility and white balance can be obtained.

Furthermore, according to still another embodiment of the present invention, the previously-extracted edge information is combined to generate image information. Therefore, an effect can be achieved such that an image with high quality and less edge blurring can be obtained.

Moreover, according to still another embodiment of the present invention, the previously-extracted edge information is combined to generate image information. Therefore, an effect can be achieved such that an image with high quality and less edge blurring can be obtained. Also, a noise removal process is performed after scaling up or down the luminance information and the color information. Therefore, an effect can be achieved such that the time for the noise removal process can be reduced.

Furthermore, according to still another embodiment of the present invention, the sensitivity of the image information can be improved. Therefore, an effect can be achieved such that a high-quality image with excellent color reproducibility and white balance can be obtained.

Moreover, according to still another embodiment of the present invention, the previously-extracted edge information is combined to generate image information. Therefore, an effect can be achieved such that an image with high quality and less edge blurring can be obtained. Also, a noise removal process is performed after scaling up or down the luminance information and the color information. Therefore, an effect can be achieved such that the time for the noise removal process can be reduced. Furthermore, the sensitivity of the image information can be improved. Therefore, an effect can be achieved such that a high-quality image with excellent color reproducibility and white balance can be obtained.

The above and other embodiments, features, advantages and technical and industrial significance of this invention will be better understood by reading the following detailed description of presently preferred embodiments of the invention, when considered in connection with the accompanying drawings.

What is claimed is:

1. An image processing apparatus comprising:
    an image-information obtaining unit to obtain image information;
    an image-component separating unit to separate the image information obtained by the image-information obtaining unit into luminance information and color information;
    a luminance-noise removing unit to remove noise from the luminance information separated by the image-component separating unit;
    a color-noise removing unit to remove noise from the color information separated by the image-component separating unit;
    a filter-size storage unit that stores an imaging condition indicating an imaging state at a time of imaging the image information and a size of the filter, in association with each other;
a parameter storage unit that stores the imaging condition indicating the imaging state at the time of imaging the image information and a σ value and a κ value, which are parameters in a Laplacian of Gaussian function, in association with each other, wherein the σ value indicates a parameter that determines a width of the filter and the κ value indicates a parameter representing a strength of edge enhancement;
    an imaging-condition obtaining unit to obtain the imaging condition;
    a filter determining unit to specify a size of a filter associated with the imaging condition obtained by the imaging-condition obtaining unit from the filter-size storage unit, and to specify the σ value and the κ value associated with the imaging condition obtained by the imaging-condition obtaining unit from the parameter storage unit and to determine the filter based on a Laplacian of Gaussian function defined by the specified size, the specified σ value, and the κ value:
    an edge extracting unit to extract edge information from the luminance information separated by the image-component separating unit, by using the filter determined by the filter determining unit; and
    an image-information synthesizing unit to synthesize image information based on the edge information extracted by the edge extracting unit, the luminance information from which the noise is removed by the luminance-noise removing unit, and the color information from which the noise is removed by the color-noise removing unit.

2. The image processing apparatus according to claim 1, wherein the imaging condition includes an exposure time.

3. The image processing apparatus according to claim 1, wherein the imaging condition includes a temperature at the time of imaging.

4. The image processing apparatus according to claim 1, wherein the imaging condition includes an imaging sensitivity.

5. An imaging apparatus comprising:
    an imaging unit to capture an image of a subject, and outputs image information of the subject; and
    the image processing apparatus according to claim 1, wherein
    the image-information obtaining unit obtains the image information from the imaging unit.

6. An image processing method comprising:
    obtaining image information;
    separating the image information obtained at the obtaining into luminance information and color information;
    luminance-noise removing including removing noise from the luminance information;
    color-noise removing including removing noise from the color information;
    storing an imaging condition indicating an imaging state at a time of imaging the image information and a size of the filter, in association with each other;
    storing the imaging condition indicating the imaging state at the time of imaging the image information and a σ value and a κ value, which are parameters in a Laplacian of Gaussian function, in association with each other, wherein the σ value indicates a parameter that determines a width of the filter and the κ value indicates a parameter representing a strength of edge enhancement;
    obtaining the imaging condition;
    specifying a size of a filter associated with the imaging condition;
    specifying the σ value and the κ value associated with the imaging condition obtained;
    determining the filter based on a Laplacian of Gaussian function defined by the specified size, the specified σ value, and the specified κ value;
    extracting edge information from the luminance information, by using the determined filter; and
    synthesizing image information based on the edge information, the luminance information from which the noise is removed, and the color information from which the noise is removed.

7. A computer program product comprising a non-transitory computer-usable medium having computer-readable program codes embodied in the medium that when executed cause a computer to execute the image processing method according to claim 6.

* * * * *